US007431181B2

(12) United States Patent
Masuda

(10) Patent No.: US 7,431,181 B2
(45) Date of Patent: Oct. 7, 2008

(54) FLUID-DISPENSING PUMP AND CONTAINER PROVIDED THEREWITH

(76) Inventor: Masatoshi Masuda, 2, 9-banchi, Takada-Cho, Saiin, Ukyo-ku, Kyoto-city, Kyoto 615-0031 (JP)

(*) Notice: Subject to any disclaimer, the term of this patent is extended or adjusted under 35 U.S.C. 154(b) by 602 days.

(21) Appl. No.: 11/086,058

(22) Filed: Mar. 22, 2005

(65) Prior Publication Data

US 2005/0218160 A1 Oct. 6, 2005

(30) Foreign Application Priority Data

Mar. 26, 2004 (JP) ............................ 2004-092747

(51) Int. Cl.
*G01F 11/00* (2006.01)

(52) U.S. Cl. .................... 222/256; 222/321.7; 222/340; 222/383.1; 222/386

(58) Field of Classification Search ................. 222/207, 222/340, 256–258, 383.1, 380, 386, 386.5, 222/321.2, 387, 321.7, 309, 321.8, 321.9
See application file for complete search history.

(56) References Cited

U.S. PATENT DOCUMENTS

| | | | | |
|---|---|---|---|---|
| 3,406,909 | A | 10/1968 | Pfeiffer | |
| 4,771,925 | A * | 9/1988 | Stoffler et al. | 222/207 |
| 5,819,990 | A * | 10/1998 | Cimentepe et al. | 222/207 |
| 5,823,394 | A * | 10/1998 | Davis et al. | 222/137 |
| 6,021,924 | A * | 2/2000 | Suck et al. | 222/105 |
| 6,047,862 | A * | 4/2000 | Davies | 222/145.3 |
| 6,681,962 | B2 | 1/2004 | Masuda | |
| 6,962,273 | B2 * | 11/2005 | Masuda | 222/321.9 |
| 7,306,123 | B2 * | 12/2007 | Masuda | 222/386 |
| 2002/0166876 | A1 * | 11/2002 | Masuda | 222/309 |
| 2003/0230600 | A1 | 12/2003 | Masuda | |

FOREIGN PATENT DOCUMENTS

| | | | |
|---|---|---|---|
| EP | 1 256 385 | A2 | 11/2002 |
| EP | 1 364 719 | A1 | 11/2003 |
| JP | 64-66475 | | 3/1989 |
| JP | 2002-066401 | | 3/2002 |
| JP | 2005-21826 | | 1/2005 |
| WO | WO 94/20221 | | 9/1994 |

OTHER PUBLICATIONS

U.S. Appl. No. 11/048,315, filed Feb. 1, 2005, Masatoshi Masuda.

* cited by examiner

*Primary Examiner*—Frederick C. Nicolas
(74) *Attorney, Agent, or Firm*—Katsuhiro Arai; Naoki Miki

(57) ABSTRACT

A fluid-dispensing pump 1 includes a cylinder 11, a piston 12 which can reciprocate inside the cylinder 11, a coupling tube 13 for coupling the nozzle head 2 and the piston 12, a coil spring 17 for giving momentum to the piston 12 in a direction of sending it up via the coupling tube 13, an inflow valve mechanism 14 for introducing a fluid stored inside the fluid-storing portion 4 into the cylinder 11, an outflow valve mechanism 15 for dispensing the fluid from the nozzle head 2, and a leakage prevention mechanism 18, which prevents a fluid having flowed into the cylinder 11 from leaking out to a fluid flow path 131 of the coupling tube 13 when a pressure is not applied to the nozzle head 2.

16 Claims, 24 Drawing Sheets

FLUID-DISPENSING PUMP AND CONTAINER PROVIDED THEREWITH

BACKGROUND OF THE INVENTION

1. Field of the Invention

The present invention generally relates to a fluid-dispensing pump for discharging a fluid stored inside a fluid-storing portion from a nozzle head by pressing the nozzle head.

2. Description of the Related Art

As this kind of fluid-dispensing pump, for example, a fluid-dispensing pump comprising a nozzle head for discharging a fluid, a fluid-storing portion for storing the liquid, a cylinder disposed on the upper side of the fluid-storing portion, a piston which can reciprocate inside the cylinder with the nozzle head being pressed, an inflow valve mechanism for letting the fluid stored in the fluid-storing portion flow into the cylinder with the piston being ascending, and an outflow valve mechanism for letting the fluid flow out to the nozzle head with the piston being descending has been used.

Particularly, after the cylinder is sent down by pressing the nozzle head and then a pressure applied to the nozzle head is removed, a metal coil spring used as a means of giving momentum sends a cylinder up again, and Japanese Patent Laid-open No. 2002-66401 discloses a fluid-dispensing pump having a configuration of maintaining it clean by preventing the coil spring from corroding.

The fluid-dispensing pump described in Japanese Patent Laid-open No. 2002-66401 comprises a piston which can reciprocate inside the cylinder, hollow first and second coupling tubes for sending the piston down by transmitting a pressure applied to the nozzle head by coupling the nozzle head and the piston, a coil spring disposed in the outer periphery of the first and second coupling tubes for giving momentum to the piston in a direction of sending it up, a first valve mechanism for letting a fluid stored in a fluid-storing portion flow into the cylinder with the piston being ascending, and a second valve mechanism for letting a fluid having flowed into the cylinder flow out to the nozzle head via inside the first and second coupling tubes with the piston being descending.

However, the fluid-dispensing pump described in Japanese Patent Laid-open No. 2002-66401 has the configuration in which a flow path leading into the first and the second coupling tubes from inside the cylinder is formed with the first and the second coupling tubes descending relative to the piston. Therefore, in order to prevent a fluid from leaking out to inside the first and the second coupling tubes by completely closing the flow path leading into the first and the second coupling tubes from inside the cylinder, this fluid-dispensing pump has a problem in that high machining accuracy is required for manufacturing the first and the second coupling tubes.

SUMMARY OF THE INVENTION

Consequently, in an aspect, an object of the present invention is to solve one or more of the above-mentioned problems. An object of an embodiment of the present invention is to provide a fluid-dispensing pump which is able to prevent fluid leakage completely while having a simple configuration, and is able to maintain it clean.

The present invention can be practiced in various ways including, but not limited to, embodiments described below, wherein numerals used in the drawings are used solely for the purpose of ease in understanding of the embodiments which should not be limited to the numerals. Further, in the present specification, different terms or names may be assigned to the same element, and in that case, one of the different terms or names may functionally or structurally overlap or include the other or be used interchangeably with the other.

In an aspect, the present invention provides a fluid-dispensing pump (e.g., 1, 5) for discharging therethrough a fluid stored inside a fluid-storing portion (e.g., 4) from a nozzle head (e.g., 2), said fluid-dispensing pump being configured to be disposed between the fluid-storing portion and the nozzle head and comprising: (i) a cylinder (e.g., 11, 51); (ii) an inflow valve mechanism (e.g., 14, 54) disposed at a bottom of the cylinder for introducing the fluid into the cylinder; (iii) an outflow valve mechanism (e.g., 15, 55) disposed near the nozzle head for discharging the fluid through the nozzle head; (iv) a central tube (e.g., 13, 53) having a fluid path (e.g., 131, 531) axially formed inside; (v) a leakage prevention valve body (e.g., 181, 581) fixed at and extending outward from a lower end of the central tube; and (vi) a piston (e.g., 13, 52) fixed around and to the central tube and configured to fluid-tightly reciprocate (e.g., 31, 35) against an inner wall (e.g., 32, 513) of the cylinder with the central tube and the leakage prevention valve body between a lower position and an upper position, wherein the central tube has an inlet opening (e.g., 132, 532) disposed between the piston and the leakage prevention valve body and communicated with the fluid path, wherein an inner surface (e.g., 182, 514) is formed inside the cylinder and is in contact with a periphery of the leakage prevention valve body to close a space therebetween when the piston is at the upper position.

In the above embodiment, it becomes possible to prevent fluid leakage securely even though its configuration is simple; additionally, it becomes possible to maintain the fluid-dispensing pump clean.

The above embodiment further includes, but is not limited to, the following embodiments:

The inflow valve mechanism may be fitted inside the cylinder and the inner surface inside the cylinder is constituted by a part (e.g., 182) of the inflow valve mechanism. In the above, the inflow valve mechanism may comprise an inflow valve body member (e.g., 141) composed of a valve body (e.g., 141*a*), a support (e.g., 182), and connecting members (e.g., 141*c*) which elastically connect the valve body to the support, wherein the part of the inflow valve mechanism constituting the inner surface is an inner surface (e.g., 182*a*) of the support.

The inner surface inside the cylinder may be a part of an inner wall (e.g., 514) of the cylinder. In the above, the inner wall of the cylinder may comprise a first portion (e.g., 513) having a first inner diameter configured to fit the piston therein and a second portion (e.g., 514) having second inner diameter configured to fit the leakage prevention valve body therein, the second inner diameter being greater than the first inner diameter, wherein the inner surface inside the cylinder is a step (e.g., 517) formed between the first portion and the second portion.

The fluid-dispensing pump may further comprise an urging member (e.g., 17) which elastically biases the piston upward. The urging member may be a coil spring (e.g., 17) disposed between the outflow valve mechanism and the piston outside the central tube.

The fluid-dispensing pump may further comprise a coupling member (e.g., 19, 552) which couples the outflow valve mechanism and the center tube, wherein the outflow valve mechanism is comprised of an outflow valve body member (e.g., 151, 551) and an outflow valve seat member (e.g., 152*a*) which is integrally formed with and becomes a part of the coupling member, wherein a periphery of the outflow valve body member is in contact with an inner surface (e.g., 153) of the valve seat member to close the outflow valve mechanism when the piston moves toward the upper position.

The inflow valve mechanism may be comprised of an inflow valve body member (e.g., 141) and an inflow valve seat member (e.g., 142) which is integrally formed with and becomes a part of the cylinder, wherein the inflow valve body member is in contact with the inflow valve seat member to close the inflow valve mechanism when the piston moves toward the lower position.

The inflow valve mechanism may be comprised of an inflow valve body member (e.g., 541) and an inflow valve seat member (e.g., 542) which is fixed inside the cylinder, wherein the inflow valve body member is in contact with the inflow valve seat member to close the inflow valve mechanism when the piston moves toward the lower position.

The cylinder may have a flange (e.g., 36, 511) configured to be attached to a neck portion (e.g., 10) of the fluid-storing portion.

The outflow valve body member may comprise a base (e.g., 151*b*) and a valve body (e.g., 151*a*) attached to and extending outward from the base, said base having grooves (e.g., 151*c*) in an axial direction of the coupling member and being fitted in the coupling member.

In another aspect, the present invention provides a container for storing and discharging a fluid, comprising: (a) a fluid-storing portion (e.g., 4) for storing a fluid therein; (b) a nozzle head (e.g., 2) for discharging the fluid therethrough; and (c) any one of the fluid-dispensing pumps (e.g., 1, 5) of the foregoing provided between the fluid-storing portion and the nozzle head.

The above embodiment further includes, but is not limited to, the following embodiments:

The fluid-storing portion may be comprised of a neck portion (e.g., 10) to which the fluid-dispensing pump is connected, a side wall (e.g., 41), and a piston (e.g., 42) provided at a bottom opposite to the neck portion, said piston being movable toward the neck portion as an inner pressure of the fluid-storing portion decreases.

The fluid-storing portion may be comprised of a neck portion (e.g., 10) to which the fluid-dispensing pump is connected, a side wall (e.g., 41), and a bottom (e.g., 42), wherein the cylinder has a flange (e.g., 36, 511) attached to the neck portion.

The container may further comprise a screw member (e.g., 16, 56) which secures the flange and the neck portion.

In all of the aforesaid embodiments, any element used in an embodiment can interchangeably be used in another embodiment unless such a replacement is not feasible or causes adverse effect. Further, the present invention can equally be applied to apparatuses and methods.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes.

FIGS. 7(*a*)-(*c*) are a front view (with dotted lines showing the inside structure), cross sectional view, and bottom view, respectively.

FIGS. 8(*a*)-(*c*) are a top view, cross sectional view, and bottom view, respectively.

FIGS. 9(*a*)-(*c*) are a top view, side view, and bottom view, respectively.

FIGS. 10(*a*)-(*b*) are a top view (with dotted lines showing the inside structure), and cross sectional view, respectively.

FIGS. 11(*a*)-(*b*) are a top view (with dotted lines showing the inside structure), and cross sectional view, respectively.

FIGS. 19(*a*)-(*c*) are a front view, cross sectional view, and bottom view, respectively.

FIGS. 20(*a*)-(*b*) are a cross sectional view and bottom view, respectively.

FIGS. 21(*a*)-(*b*) are a top view and cross sectional view, respectively.

FIGS. 22(*a*)-(*c*) are a top view, cross sectional view, and bottom view, respectively.

FIGS. 23(*a*)-(*b*) are a top view (with dotted lines showing the inside structure), and cross sectional view, respectively.

Explanation of Symbols Used (different terms or names may be assigned to the same element, and in that case, one of the different terms or names may functionally or structurally overlap or include the other or be used interchangeably with the other): 1: Fluid-dispensing pump; 2: Nozzle head: 3: Outer lid; 4: Fluid-storing portion; 5: Fluid-dispensing pump; 11: Cylinder; 12: Piston; 13: Coupling tube; 14: Inflow valve mechanism; 15: Outflow valve mechanism; 16: Screw member; 17: Coil spring; 18: Leakage prevention mechanism; 19: Coupling tube aiding member; 21: Tubular member; 22: Guiding member; 41: Cylinder member; 42: Piston member; 43: Inner lid; 43*a*: Air vent; 44: Outer lid; 44*a*: Air vent; 51: Cylinder; 52: Piston; 53: Coupling tube; 54: Inflow valve mechanism; 55: Outflow valve mechanism; 57: Coil spring; 58: Leakage prevention mechanism; 111: Opening portion; 131: Fluid flow path; 132: Inflow opening; 133: Inserted/fitted portion; 134: Fixing portion; 135: Concave portion; 141: Inflow valve member; 141*a*: Valve body; 141*b*: Supporting portion; 141*c*: Coupling portion; 141*d*: Flexion; 151: Outflow valve member; 151*a*: Valve body; 15 1*b*: Base; 151*c*: Passing groove; 152*a*: Opening; 152*b*: Support portion; 153: Inner Wall; 181: Lid member; 181*a*: Leakage prevention valve; 181*b*: Convex portion; 182: Main body; 182*a*: Wall surface; 211: Inflow portion; 212: Outflow portion; 213: Convex portion; 221: Pushing portion; 222: Opening portion; 223: Guiding portion; 511: Engaging portion; 512: Fixing portion; 513: Piston traveling portion; 514: Wall surface; 515: Coil spring fixing portion; 531: Fluid flow path; 532: Inflow opening; 533: Joined portion; 534: Fixing portion; 541: Inflow valve member; 541*a*: Valve body; 541*b*: Supporting portion; 541*c*: Coupling portion; 541*d*: Flexion; 542: Inflow valve seat member; 542*a*: Opening portion; 542*b*: Convex portion; 542*c*: Valve member fixing portion; 551: Outflow valve member; 552: Outflow valve seat member; 552*a*: Opening portion; 552*b*: Supporting portion; 552*c*: Joined portion; 552*d*: Inserted/fitted portion.

DETAILED DESCRIPTION OF THE PREFERRED EMBODIMENT

The present invention will be explained with respect to preferred embodiments. The preferred embodiments may be referred to as the present invention but are not intended to limit the present invention. The preferred embodiments are simply included in the present invention which is not limited thereto.

Figure 1:
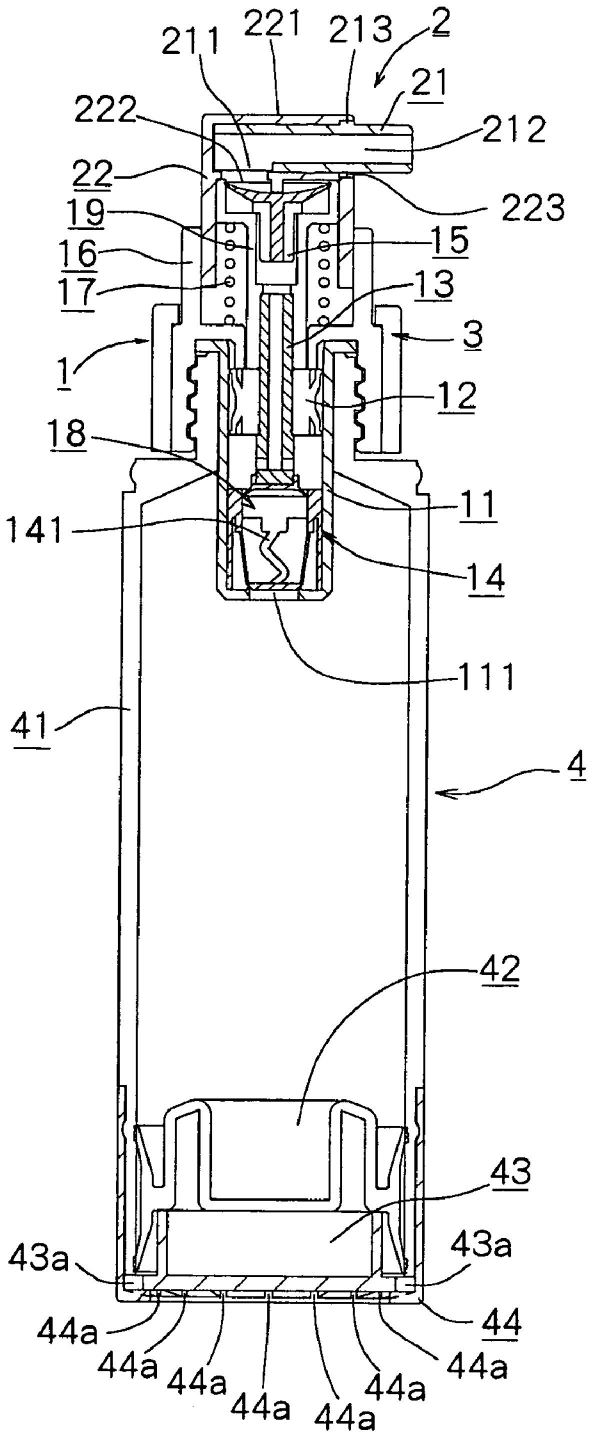
FIG. 1 is a longitudinal sectional view of a fluid-storing container to which a fluid-dispensing pump 1 according to Embodiment 1 of the present invention applies.
Figure 2:
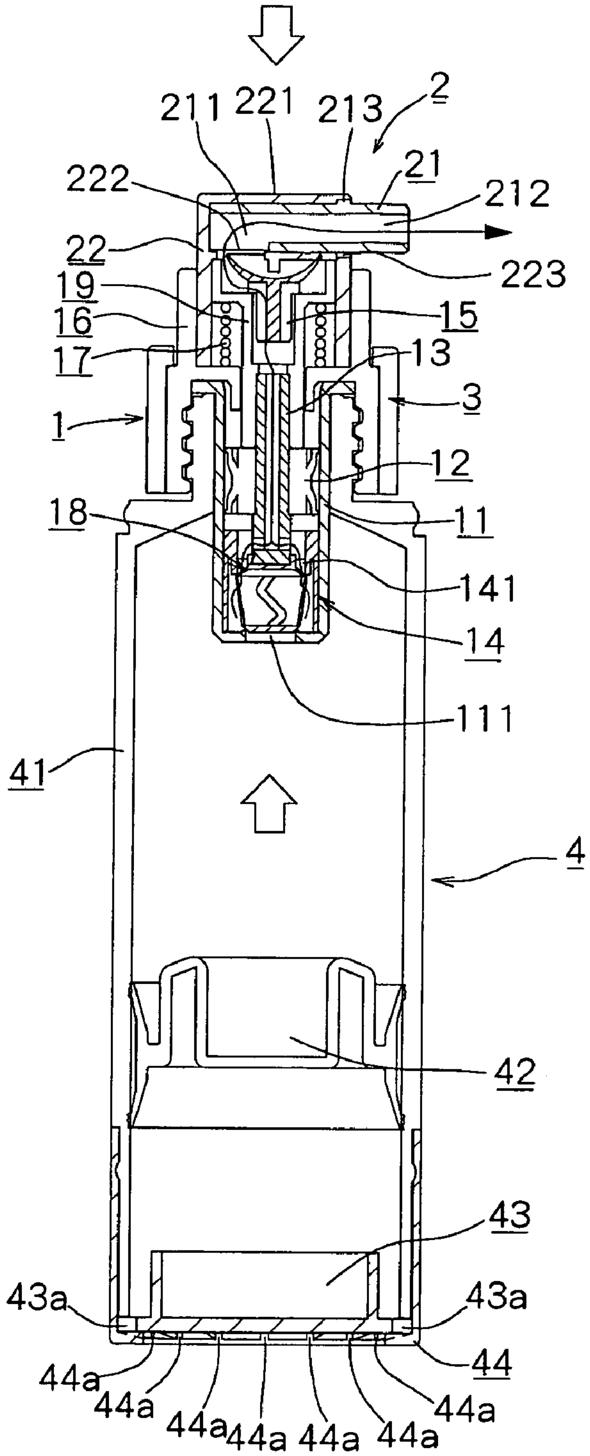
FIG. 2 is a longitudinal sectional view of the fluid-storing container of FIG. 1 when a nozzle head 2 is pressed.
Figure 3:
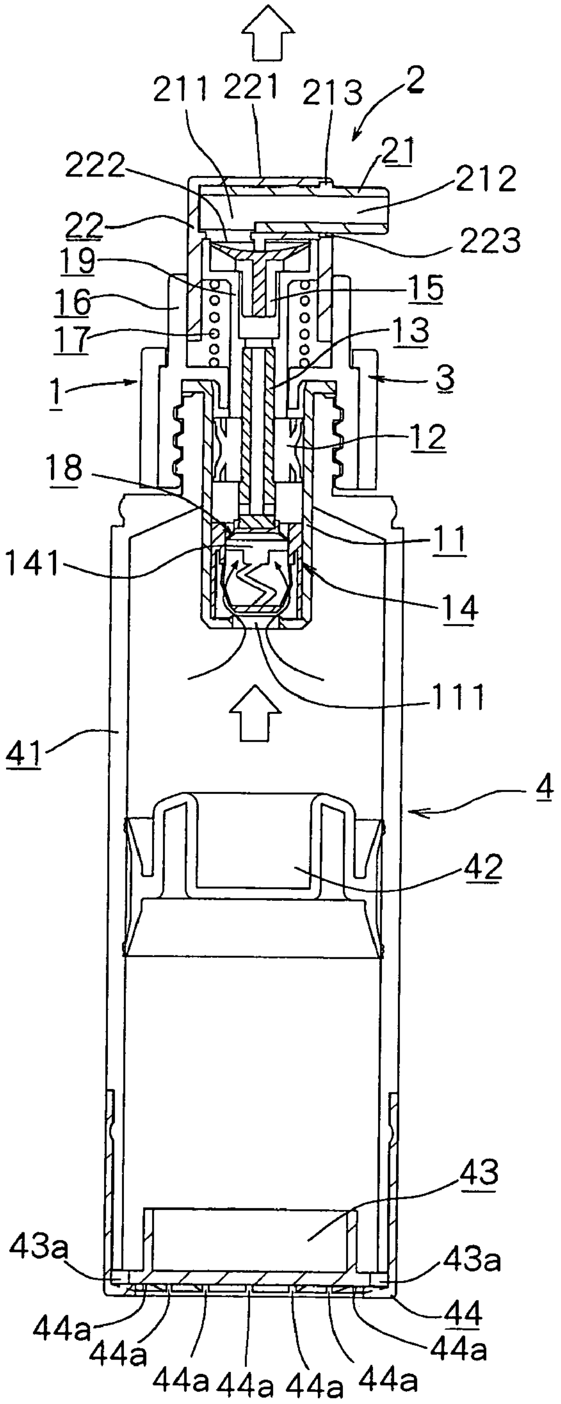
FIG. 3 is 1 is a longitudinal sectional view of the fluid-storing container of FIG. 1 when the nozzle head 2 is released.

Embodiment 1 of the present invention is described in detail below with reference to drawings attached. FIGS. 1-3 are longitudinal sectional views of a fluid-storing container to which the fluid-dispensing pump 1 according to Embodiment 1 of the present invention applies. Of these figures, FIG. 1 shows the fluid-dispensing pump 1 being left with no stress applied to it; FIG. 2 shows the coupling tube 13 being descending along with the piston 12 with a pushing portion 221 in the nozzle head 2 being pressed; FIG. 3 shows the coupling tube being ascending along with the piston 12 with a pressure applied to the pushing portion 11 in the nozzle head 2 removed.

This fluid-storing container is used as a container for beauty products for storing gels such as hair gels and cleansing gels, creams such as nourishing creams and cold creams or liquids such as skin lotions used in the cosmetic field. Additionally, this fluid-storing container also can be used as a container for medicines, solvents or foods, etc.

This fluid discharge container comprises the fluid-dispensing pump 1 according to Embodiment 1 of the present invention, a nozzle head 2, an outer lid 3, and a fluid-storing portion 4 for storing a fluid inside it. The outer lid is engaged with a screw portion formed at the upper end of the fluid-storing portion 4 through a screw member 16.

The fluid-storing portion 4 has a cylindrical cylinder member 41, a piston member 42 traveling upward and downward inside the cylinder member 41, an inner lid 43 in which multiple air vents 43*a* are formed, and an outer lid 44 in which multiple air vents 44*a* are formed. The cylinder member 41 in the fluid-storing portion 4 and the fluid-dispensing pump 1 are liquid-tightly connected.

The nozzle head 2 has a tubular member 21 and a guiding member 22 similar to those described in detail in Japanese Patent Laid-open No. 2005-021826. The tubular member 21 has an inflow portion 211 for letting a fluid flow in from an outflow valve mechanism 15 in the fluid-dispensing pump 1, an outflow portion 212 for letting a fluid having flowed in from the inflow portion 211 flow out to the outside, and a convex portion 213 being guided by the guiding member 22. The guiding member 22 has a pushing portion 221, an opening portion 222 being communicated with the inflow portion 211 of the tubular member 21 when it is open, and a guiding portion 223 supporting the tubular member 21 and guiding a switchover of open and closed positions of the tubular member 21. The tubular member 21 and the guiding member 22 are joined with the convex portion 213 of the tubular member 21 and the guiding portion 223 of the guiding member 22 facing each other.

The tubular member 21 is rotatably supported on its center of axle against the guiding member 22; the nozzle head 2 can be switched over between an open position in which the inflow portion 211 of the tubular member 21 and the opening portion 222 of the guiding member 22 are communicated with each other to enable a fluid to pass through between the inflow portion 211 of the tubular member 22 and the outflow valve mechanism 15 described in detail later, and a closed position in which passing through of the fluid between the inflow portion 211 and the outflow valve mechanism 15 is shut off.

In this fluid-storing container, as shown in FIG. 2, by reciprocating the pushing portion 221 in the nozzle head 2, which has been switched over to the open position, upward and downward by pressing it, a fluid stored inside the fluid-storing portion 4 is discharged from the outflow portion 212 in the nozzle head 2 by the action of the fluid-dispensing pump 1 described in detail later. As shown in FIG. 3, as an amount of the fluid inside the fluid-storing portion 4 is decreased, the piston member 42 travels inside the cylinder member 41 toward the nozzle head 2.

Additionally, in this specification, upward and downward directions in FIGS. 1 to 3 are defined as upward and downward directions in the fluid-storing container. In other words, in the fluid-storing container according to the present invention, the side of the nozzle head 2 shown in FIG. 1 is defined as the upward direction; the side of the piston 42 is defined as the downward direction.

Figure 4:
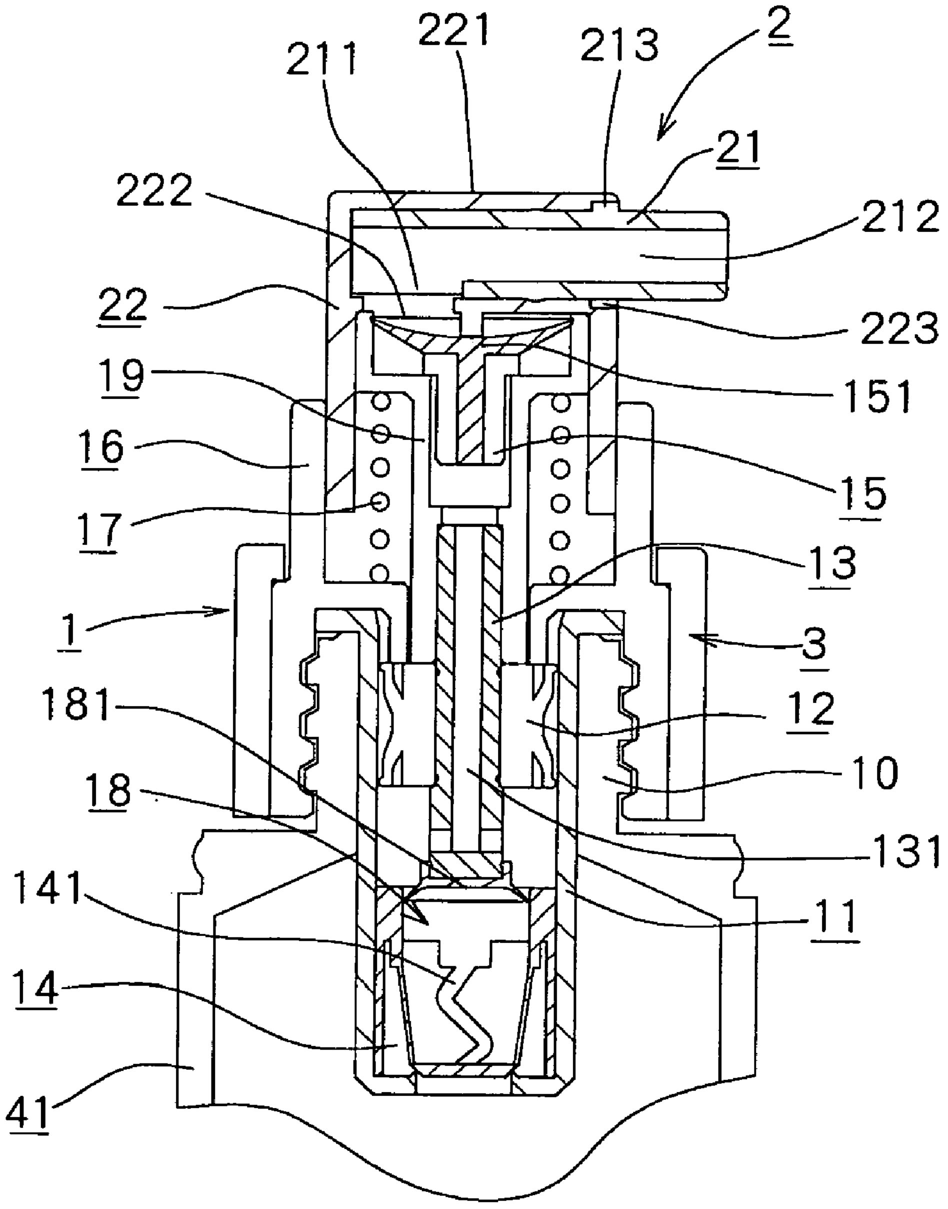
FIG. 4 is a longitudinal sectional view showing a relative part of the fluid-dispensing pump 1.
Figure 5:
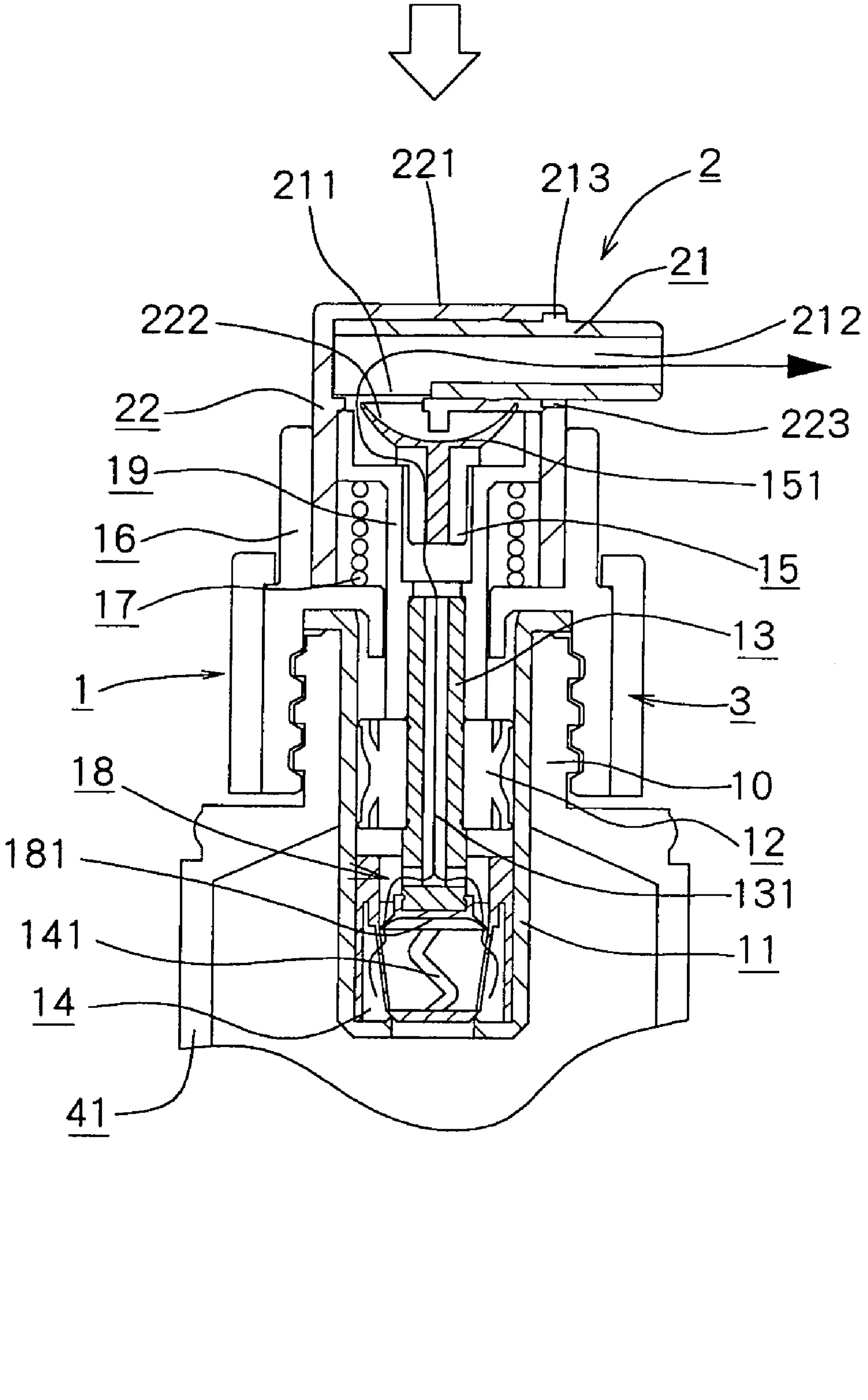
FIG. 5 is a longitudinal sectional view of the fluid-dispensing pump 1 when the nozzle head 2 is pressed.
Figure 6:
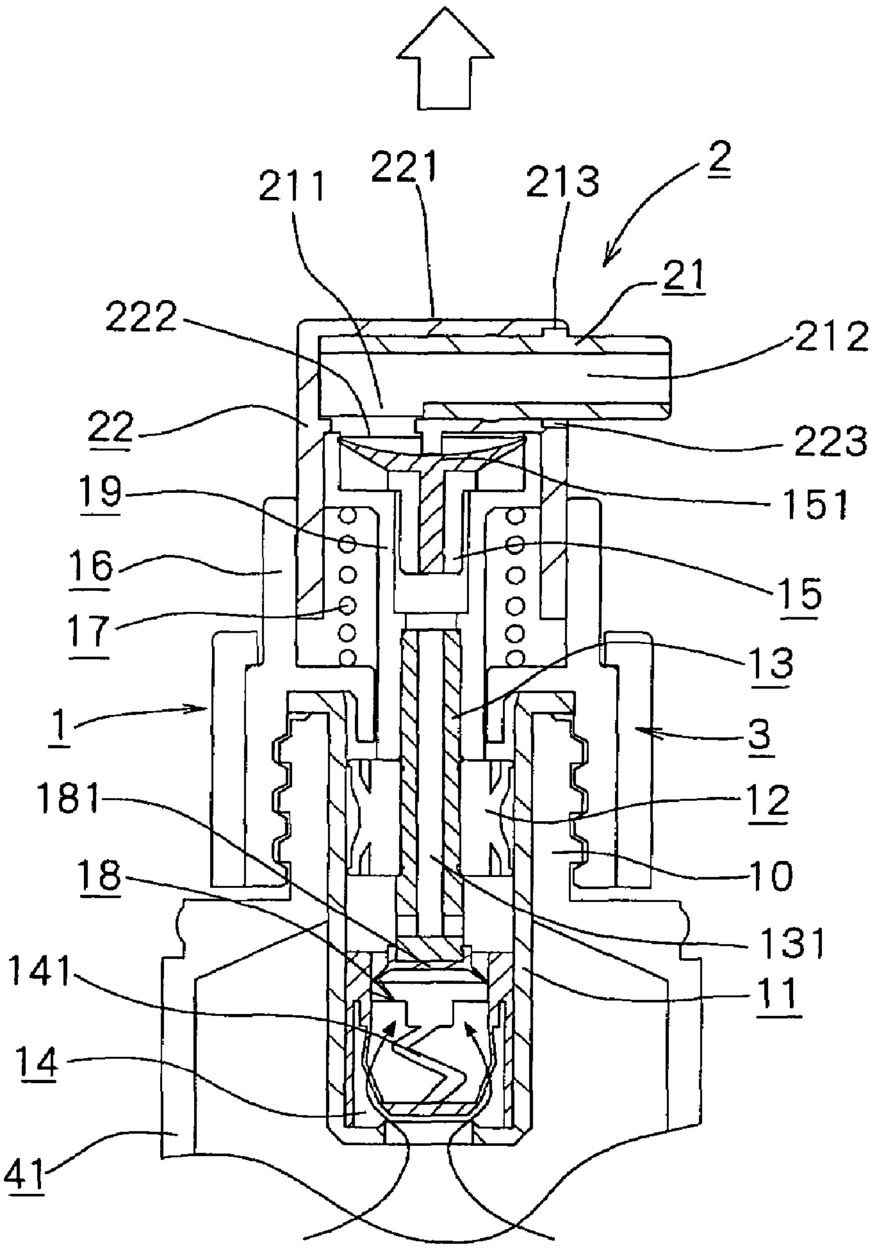
FIG. 6 is a longitudinal sectional view of the fluid-dispensing pump 1 when he nozzle head 2 is released.

A configuration of the fluid-dispensing pump 1 according to Embodiment 1 of the present invention is described below. FIGS. 4-6 are longitudinal sectional views showing the fluid-dispensing pump 1 according to Embodiment 1 of the present invention along with the nozzle head 2.

Of these figures, FIG. 4 shows the fluid-dispensing pump 1 being left with no stress applied to it; FIG. 5 shows the coupling tube 13 being descending along with the piston 12 with the pushing portion 211 in the nozzle head 2 being pressed; FIG. 6 shows the coupling tube 13 being ascending along with the piston 12 with a pressure applied to the pushing portion 211 in the nozzle head 2 removed.

This fluid-dispensing pump 1 comprises the cylinder 11 disposed on top of the fluid-storing portion 4, the piston 12 which can reciprocate inside the cylinder 11, the coupling tube 13 for sending the piston 12 down by transmitting a pressure applied to the nozzle head 2 to the piston 12 by coupling the nozzle head 2 and the piston 12, in which a hollow fluid flow path 131 is formed, a coil spring 17 as an elastic member disposed in the outer periphery of the coupling tube 13 for giving momentum to the piston 12 in a direction of sending it up via the coupling tube 13, an inflow valve mechanism 14 for letting a fluid stored inside the fluid-storing portion 4 flow out to the cylinder as the piston 12 ascends, an outflow valve mechanism 15 for letting a fluid having flowed into the cylinder 11 flow out to the nozzle head 2 via the fluid flow path 131 of the coupling tube 13, and a leakage prevention mechanism 18 being disposed at the bottom of the coupling tube 13 and preventing a fluid having flowed into the cylinder 11 from leaking out to the fluid flow path 131 of the coupling tube 13 when a pressure is not applied to the nozzle head 2.

Additionally, the fluid-dispensing pump 1 further comprises a coupling-tube aiding member 19 for joining on the nozzle head 2 and the coupling tube 13.

Additionally, the piston 12 is formed using, for example, a resin such as silicon rubber, as its source material so that its outer periphery closely contacts an inner-wall surface of the cylinder 11.

For the coil spring 17, a metal coil spring is used to obtain strong momentum. However, because this coil spring 17 is disposed in an outer periphery of the coupling tube 13 and the coupling-tube aiding member 19, it does not directly contact a fluid passing through inside the coupling tube 13.

Figure 7A:
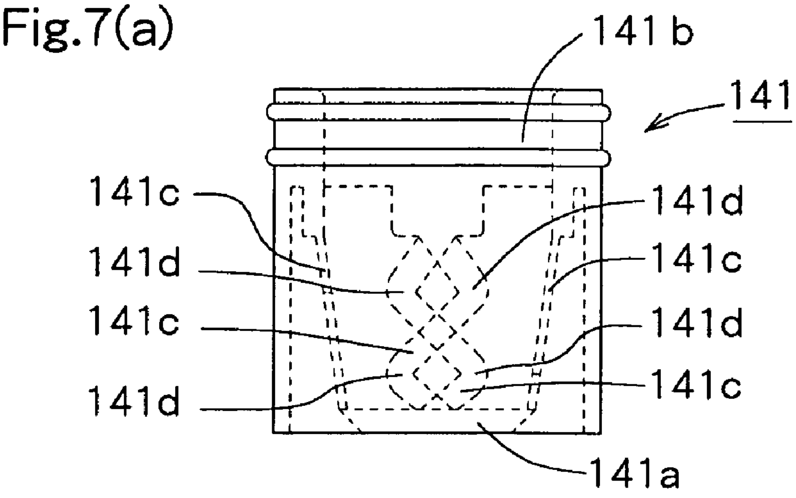
FIGS. 7(*a*)-(*c*) are explanatory views showing an inflow valve member 141 in the fluid-dispensing pump 1.
Figure 7B:
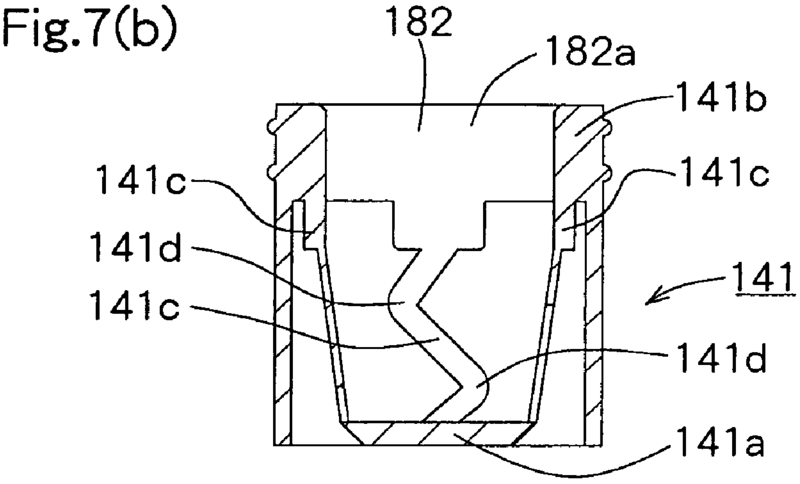
Figure 7C:
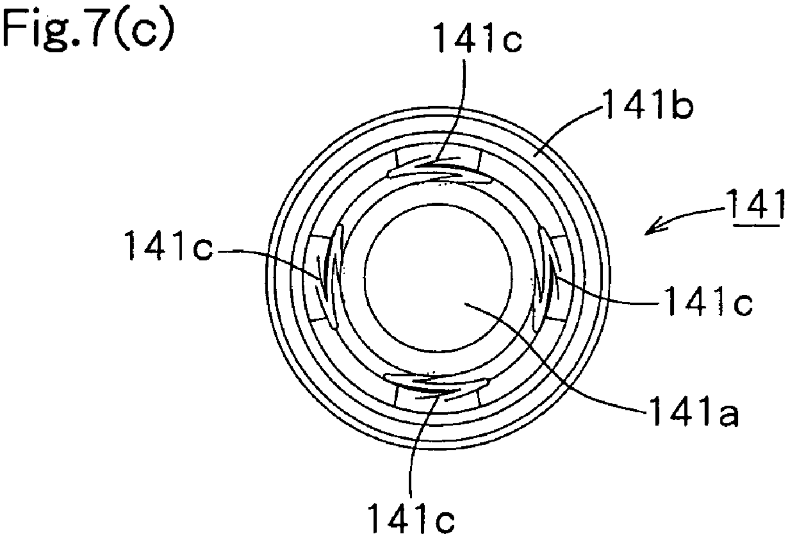

FIGS. 7(*a*)-(*c*) are a front view, sectional side view, and back side view, respectively, showing an inflow valve member 141 comprising the inflow valve mechanism 14 in the fluid-dispensing pump 1.

As shown in FIGS. 7(*a*)-(*c*), the inflow valve member 141 comprises a valve body 141*a* having a shape corresponding to an opening portion 111 formed at the lower-end portion of the cylinder 11 for letting a fluid stored inside the fluid-storing portion 4 flow into the cylinder 11, a supporting portion 141*b* being fixed inside the cylinder 11, and four coupling portions 141*d* coupling the valve body 141*a* and the supporting portion 141*b*. The respective four coupling portions 141*c* have a pair of flexions 141*d*. By this, the inflow valve member 141 has more preferred flexibility. Additionally, inside the supporting portion 141*b* in the inflow valve member 141, a tubular wall surface 182*a* is formed and comprises a main body 182 of the leakage prevention mechanism 18 which is switched over between an open position and a closed position by the lid member 181.

This inflow valve mechanism 14 is intended to close and open the opening portion 111 formed at the lower end of the cylinder 11, which is communicated with the fluid-storing portion 4 and the cylinder 11. When inside the cylinder 11 is not depressurized, this inflow valve mechanism 14 closes the opening portion 111 with the valve body 141*a* in the inflow valve member 141 being disposed in a position in which it contacts the opening portion 111. When inside the cylinder is depressurized, the valve body 141*a* is disposed in a position in which it separates from the opening portion 111 by the action of the coupling portions 141*c* in the inflow valve member 141, thereby opening the opening portion 111.

Figure 8A:
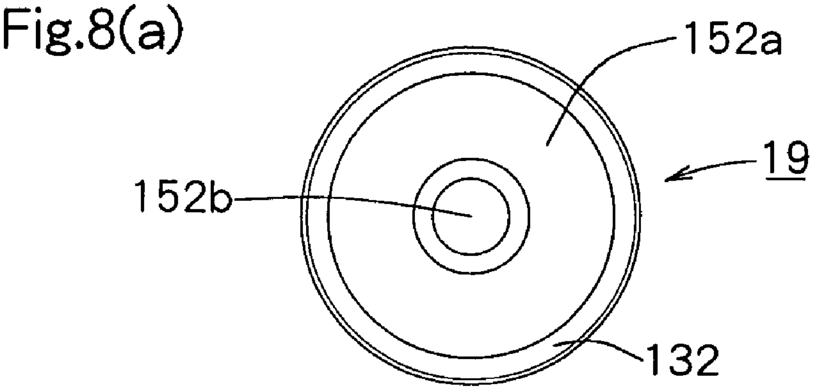
FIGS. 8(*a*)-(*c*) are explanatory views showing a coupling-tube aiding member 19 in the fluid-dispensing pump 1.
Figure 8B:
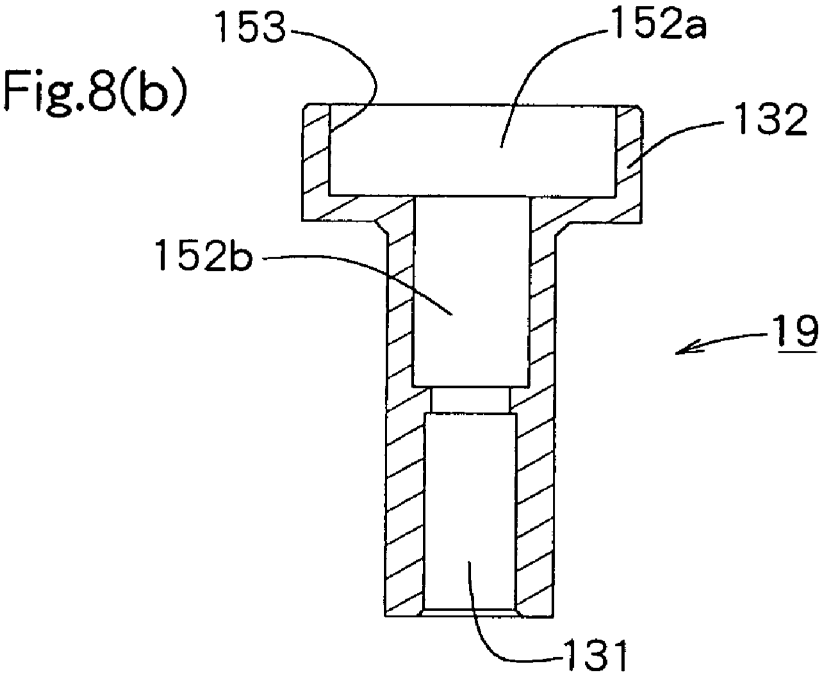
Figure 8C:
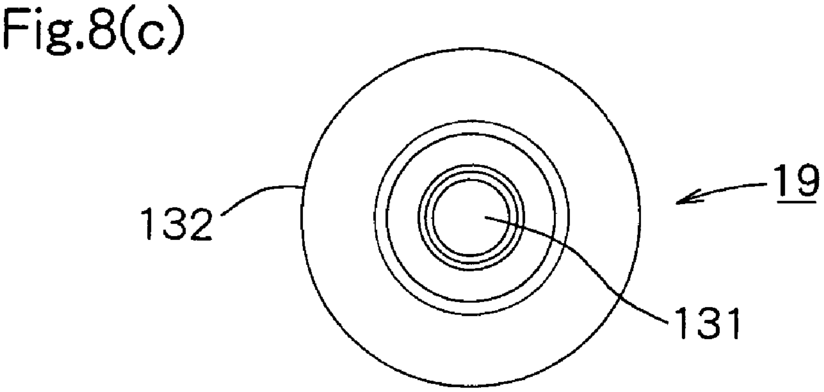

FIGS. 8(*a*)-(*c*) are a front view, lateral cross section, and back side view, respectively, showing the coupling-tube aiding member 19 in the fluid-dispensing pump 1.

Figure 9A:
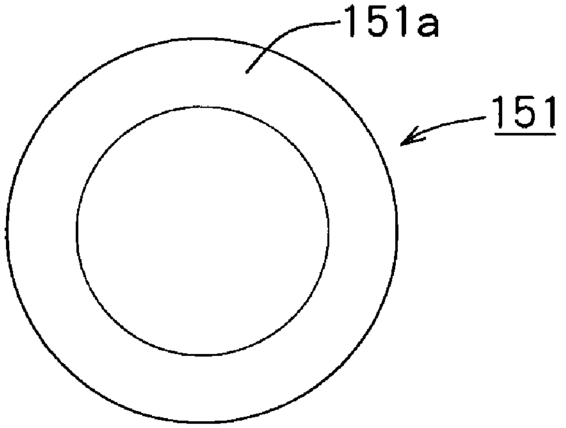
FIGS. 9(*a*)-(*c*) are explanatory views showing an outflow valve member 151 in the fluid-dispensing pump 1.
Figure 9B:
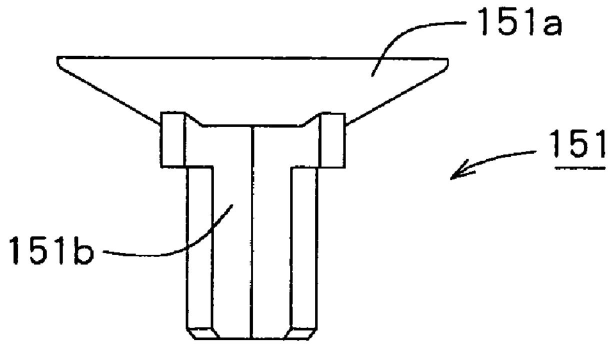
Figure 9C:
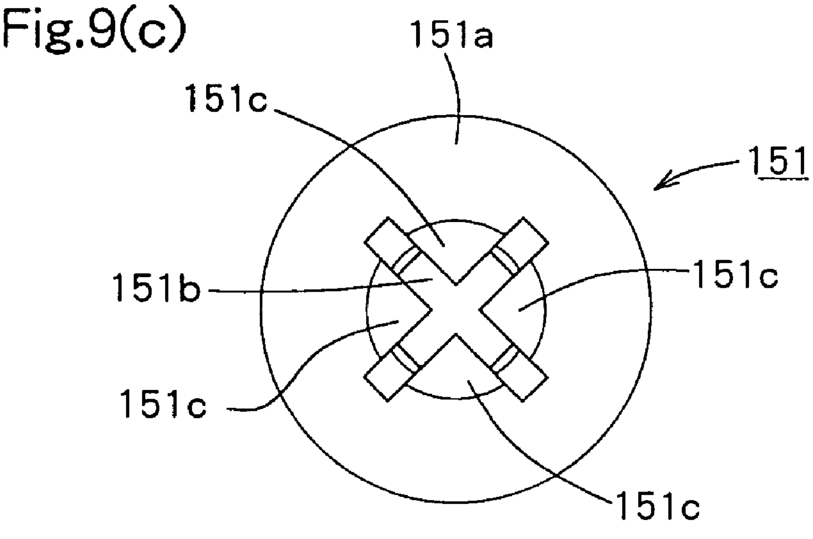

FIGS. 9(*a*)-(*c*) are a front view, lateral cross section, and back side view, respectively, showing the outflow valve member 151 comprising the outflow valve mechanism 15 in the fluid-dispensing pump 1.

As shown in FIGS. 8(*a*)-(*c*), the coupling-tube aiding member 19 comprises an opening portion 152*a* comprising the outflow valve mechanism 15, a supporting portion 152*b* comprising the outflow valve mechanism 15 and supporting a base 151*b* of the outflow valve member 151, a joined portion 131 being joined with the upper portion of the coupling tube 13, and an inserted/fitted portion 133 being fixed by being inserted/fitted into the nozzle head 2.

As shown in FIGS. 9(*a*)-(*c*), the outflow valve member 151 comprises a nearly dish-shaped valve portion 151*a* having flexibility and contacting an inner surface of the opening portion 152*a* in the coupling-tube aiding member 19, and a base 151*b* being supported by a supporting portion 152*b* in the coupling-tube aiding member 19. Additionally, in the base 151*b*, a passing groove 151*c* for letting a fluid pass through is formed.

This outflow valve mechanism 15 is intended to close and open the opening portion 152*a* being communicated with the fluid flow path 131 in the coupling tube 13 and an outflow portion 212 in the nozzle head 2. This outflow valve mechanism 15 opens the opening portion 152*a* with the valve body 151*a* being disposed in a position in which it separates from the inner surface of the opening portion 152*a* when inside the fluid flow path 131 in the coupling tube 13 is pressurized. When inside the fluid flow path 131 of the coupling tube 13 is not pressurized, the valve body 151*a* in the outflow valve mechanism is disposed in a position in which it contacts the inner surface of the opening portion 152*a*, thereby closing the opening portion 152*a*.

Figure 10A:
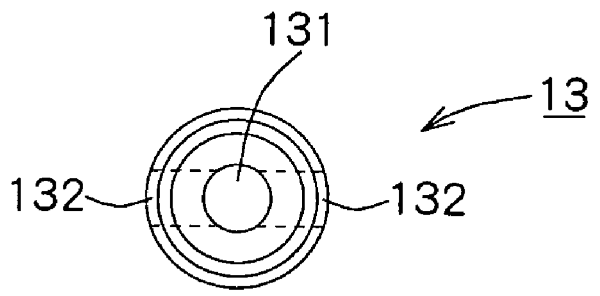
FIGS. 10(*a*)-(*b*) are explanatory views showing a coupling tube 13 in the fluid-dispensing pump 1.
Figure 10B:
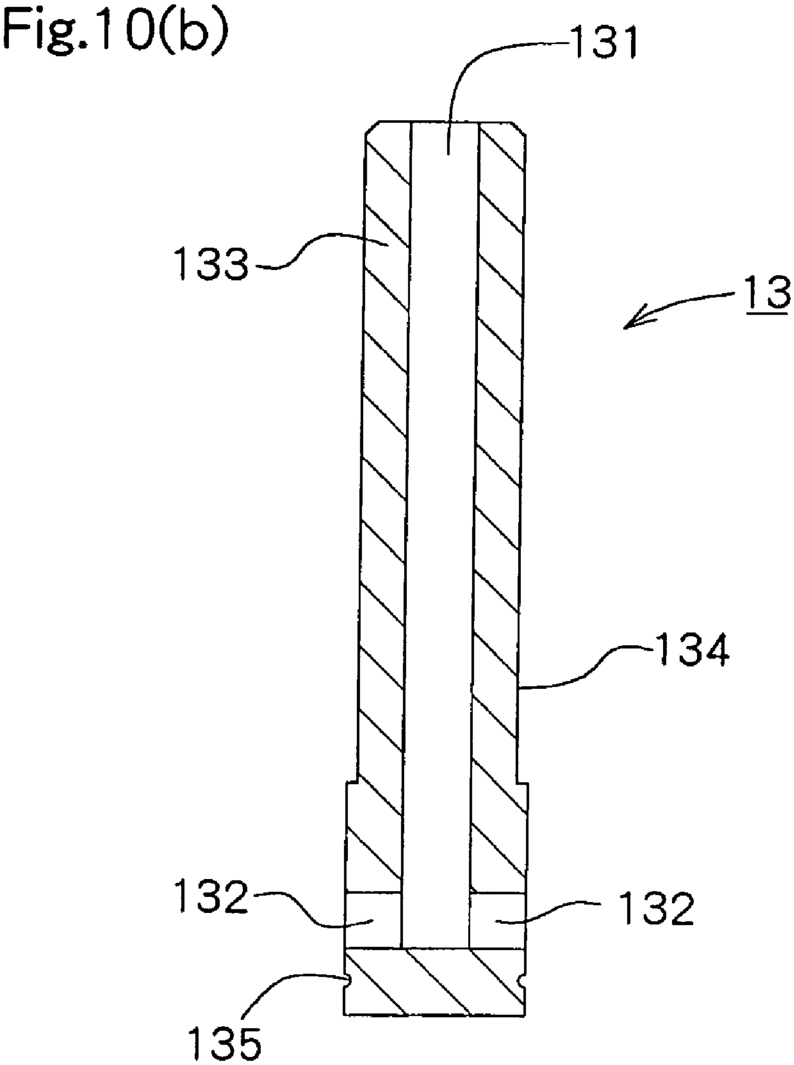

FIGS. 10(*a*)-(*b*) are a front view and lateral cross section, respectively, showing the coupling tube 13 in the fluid-dispensing pump 1.

As shown in FIGS. 10(*a*)-(*b*), the coupling tube 13 comprises a inserted/fitted portion 133 being fixed by being inserted/fitted into the joined portion of the coupling-tube aiding member 19, a fixing portion 134 for fixing the piston 12, and a concave portion 135 for supporting a lid member 181 comprising the leakage prevention mechanism 18. Additionally, inside the coupling tube 13, the fluid flow path 131 is formed. Inside the coupling tube 13, an inflow opening 132, which is communicated with the fluid flow path 131 and with the outside the coupling tube 13 and is located above the lid member 181 being supported by the concave portion 135, is formed.

Figure 11A:
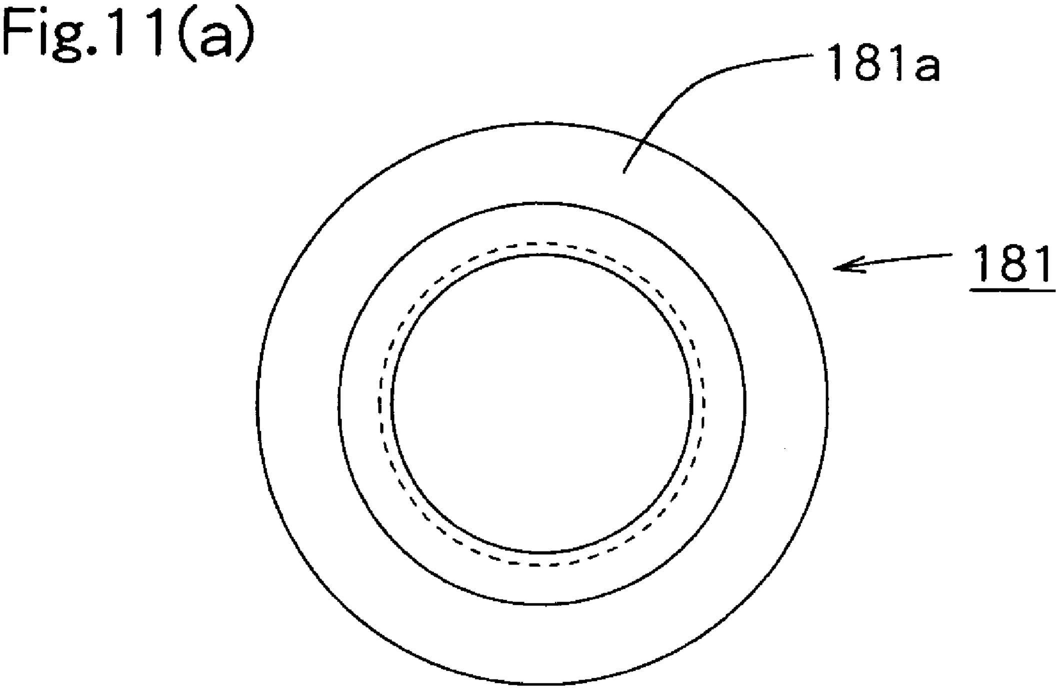
FIGS. 11(*a*)-(*b*) are explanatory views showing a lid member 181 in the fluid-dispensing pump 1.
Figure 11B:
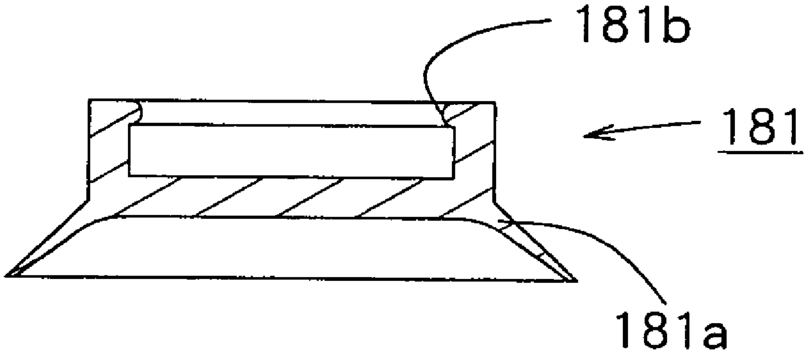

FIGS. 11(*a*)-(*b*) are a front view and lateral cross section, respectively, showing the lid member 181 comprising the leakage prevention mechanism 18 in the fluid-dispensing pump 1.

As shown in FIGS. 11(*a*)-(*b*), the lid member 181 comprises a nearly dish-shaped leakage prevention valve 181*a* having flexibility and contacting a wall surface 182*a* formed on the inner side of the supporting portion 141*b* of the inflow valve member 141 comprising the inflow valve mechanism 14, and a convex portion 181*b* for engaging with the concave portion 135 of the coupling tube 131.

The leakage prevention mechanism 18 comprises the main body 182 having the wall surface 182*a*, and the lid member 181 having the leakage prevention valve 181*a*. This leakage prevention mechanism 18 is intended to prevent a fluid having flowed into the cylinder 11 from leaking into the fluid flow path 131 of the coupling tube 13 when a pressure is not applied to the nozzle head 2. When a space formed between the inflow valve mechanism 14 and the leakage prevention mechanism 18 is pressurized with the nozzle head 2 being pressed, of the leakage prevention mechanism, the leakage prevention valve 181*a* having flexibility is disposed in a position in which it separates from the wall surface 182*a*, thereby enabling the fluid inside the space formed between the inflow valve mechanism 14 and the leakage prevention mechanism 18 to flow into the inflow opening 132 in the coupling tube 13. When the space formed between the inflow valve mechanism 14 and the leakage prevention mechanism 18 is not pressurized with a pressure applied to the nozzle head 2 removed, the leakage prevention valve 181*a* having flexibility is disposed in a position in which it contacts the wall surface 182*a*, thereby enabling to prevent the fluid inside the space formed between the inflow valve mechanism 14 and the leakage prevention mechanism 18 from leaking out to the coupling tube 13.

Figure 12:
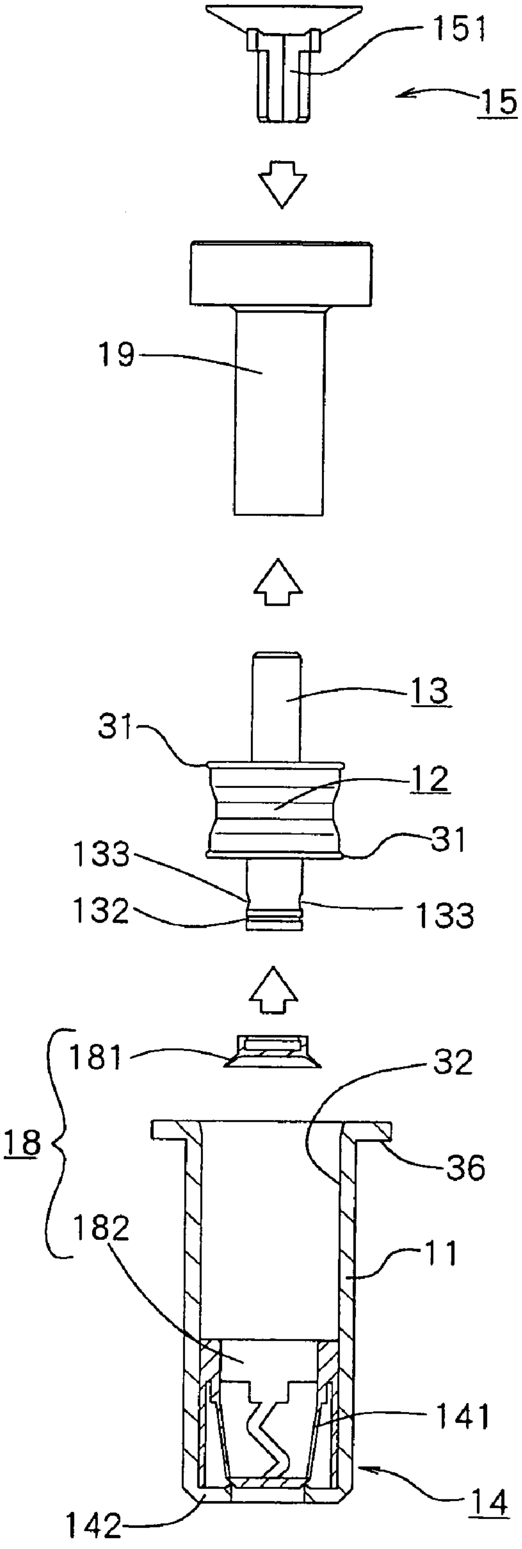
FIG. 12 is an explanatory view showing parts of the fluid-dispensing pump 1.

FIG. 12 is an explanatory view showing a configuration of the fluid-dispensing pump 1 according to Embodiment 1 of the present invention.

As shown in FIG. 12, the upper end portion of the coupling tube 13 with which the piston 12 is fixedly provided is fixed inside the coupling-tube aiding member 19 by being inserted/fitted into the coupling-tube aiding member 19. The upper end of the coupling-tube aiding member 19 is fixed inside the guiding member 22 in the nozzle head 2 by being inserted/fitted into the guiding member 22. With the concave portion 135 formed at the lower end of the coupling tube 13 being engaged with the convex portion 181*b* formed in the lid member 181 of the leakage prevention mechanism 18, the leakage prevention mechanism 18 is fixed with the coupling tube 13.

With the configuration described above, the piston 12, the coupling tube 13, the lid member 181 in the leakage prevention mechanism 18, the coupling-tube aiding member 19, and the nozzle head 2 travel as one.

Fluid discharge action of the fluid-dispensing pump 1 having the configuration described above is described referring to FIGS. 4-6 again.

As shown in FIG. 4, when the fluid-dispensing pump 1 is left with no stress being applied, in the fluid-dispensing pump 1, the valve body 141*a* of the inflow valve member 141 is disposed in a position in which it contacts the opening portion 111; the valve body 151*a* in the outflow valve mechanism is disposed in a position in which it contacts the inner surface of the opening portion 152*a*; and the leakage prevention valve 181*a* is disposed in a position in which it contacts the wall surface 182*a*. Consequently, it becomes possible to prevent a fluid from leaking from the space formed between the inflow valve mechanism 14 and the leakage prevention mechanism 18.

As shown in FIG. 5, when the pushing portion 221 in the nozzle head 2 is pressed, the piston 12, the coupling tube 13, the lid member 181 in the leakage prevention mechanism 18, the coupling-tube aiding member 19, and the nozzle head 2 travel as one.

At this time, with the space formed between the inflow valve mechanism 14 and the leakage prevention mechanism 18 being reduced, inside the space is pressurized. With the space formed between the inflow valve mechanism 14 and the leakage prevention mechanism 18 being pressurized, the leakage prevention valve 181*a* having flexibility is disposed in a position in which it separates from the wall surface 182*a*, and a fluid inside the space formed between the inflow valve mechanism 14 and the leakage prevention mechanism 18 flows into the inflow opening 132 in the coupling tube 13.

By this inflow of the fluid from the inflow opening 132 of the coupling tube 13, inside the fluid flow path 131 of the coupling tube 13 is pressurized. With inside the fluid flow path 141 being pressurized, the outflow valve mechanism 15 is pressurized from below, and the valve body 151*a* in the outflow valve mechanism is disposed in a position in which it separates from the inner surface of the opening portion 152*a*. By this, the opening portion 152*a* is opened, and a fluid flows out to the outside from the outflow portion 212 after passing through the outflow valve mechanism 15.

As shown in FIG. 6, when a pressure applied to the pushing portion 221 in the nozzle head 2 is removed, by the momentum of the coil spring 17, the coupling tube 13 ascends along with the piston 12.

At this time, with the space formed between the inflow valve mechanism 14 and the leakage prevention mechanism 18 being expanded, inside the space is depressurized. With the space formed between the inflow valve mechanism 14 and the leakage prevention mechanism 18 being depressurized, the leakage prevention valve 181*a* having flexibility is disposed in a position in which it contacts the wall surface 182*a*; by the action of the coupling portions 141*c* in the inflow valve member 141, the valve body 141*a* is disposed in a position in which it separates from the opening portion 111, thereby opening the opening portion 111; a fluid stored inside the fluid-storing portion 4 flows into the cylinder 11 after passing through the inflow valve mechanism 14.

Because the fluid-dispensing pump 1 according to Embodiment 1 of the present invention has the configuration described above, it becomes possible for the fluid-dispensing pump 1 to prevent fluid leakage securely even though its configuration is simple. Additionally, it becomes possible to maintain the fluid-dispensing pump clean by preventing corrosion of the coil spring 17.

Figure 13:
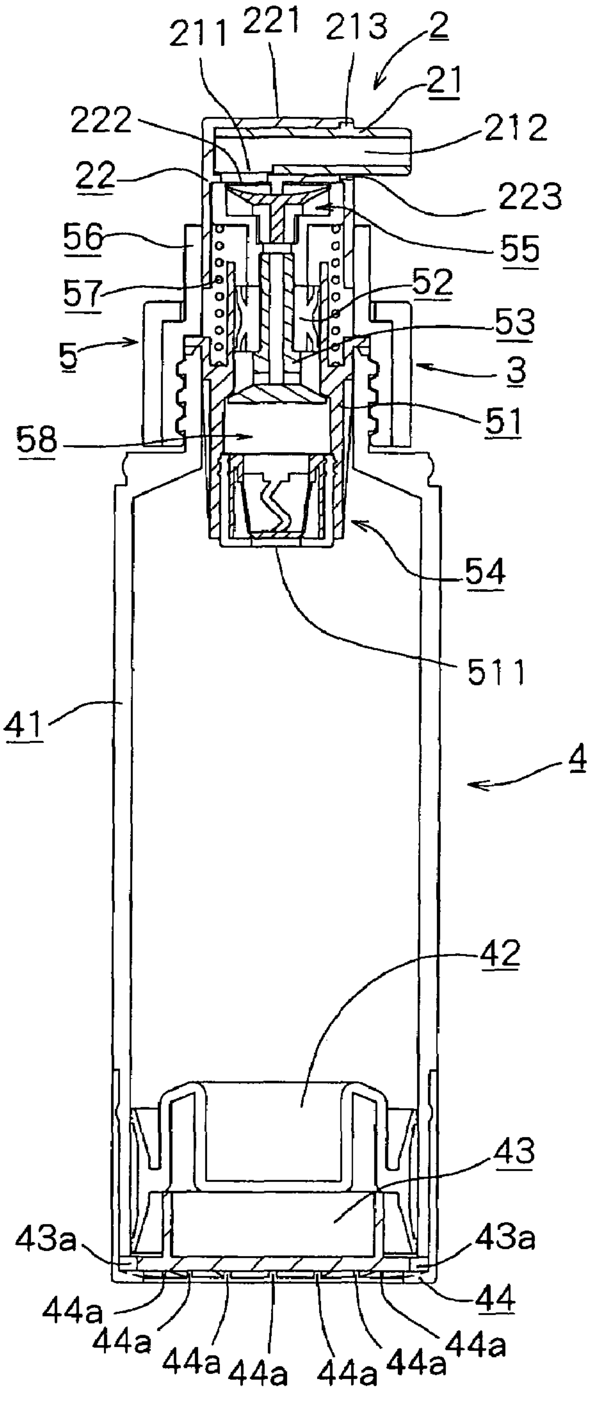
FIG. 13 is a longitudinal sectional view of a fluid-storing container to which a fluid-dispensing pump 5 according to Embodiment 2 of the present invention applies.
Figure 14:
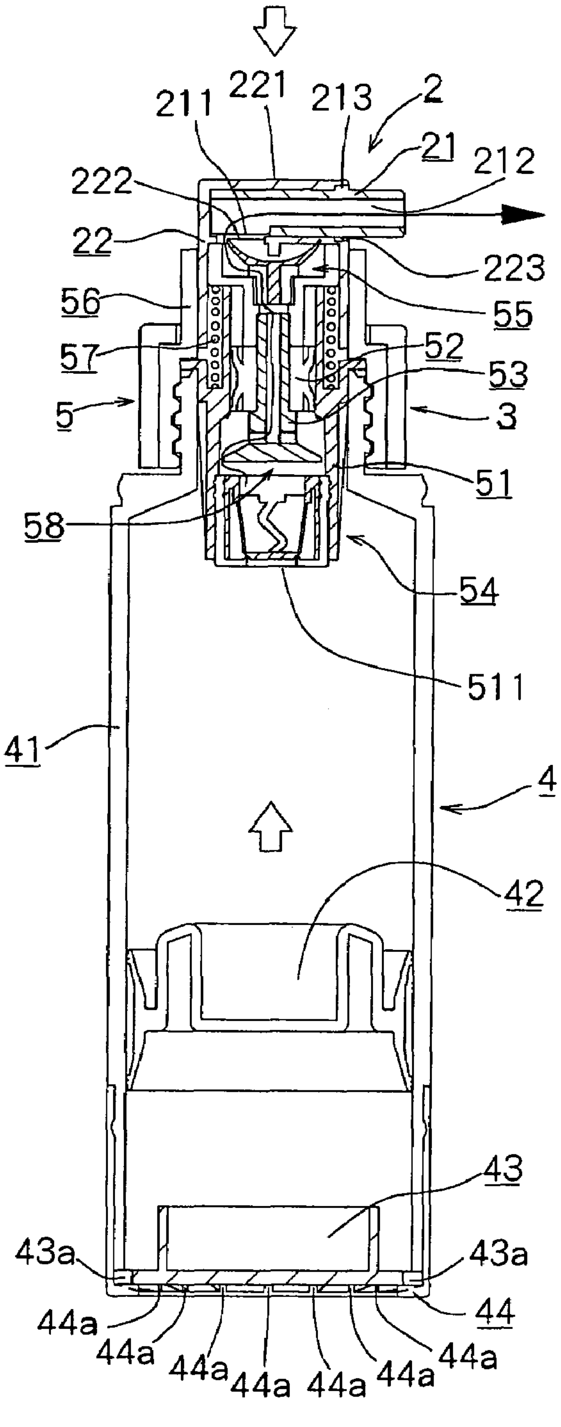
FIG. 14 is a longitudinal sectional view of the fluid-storing container of FIG. 13 when a nozzle head 2 is pressed.
Figure 15:
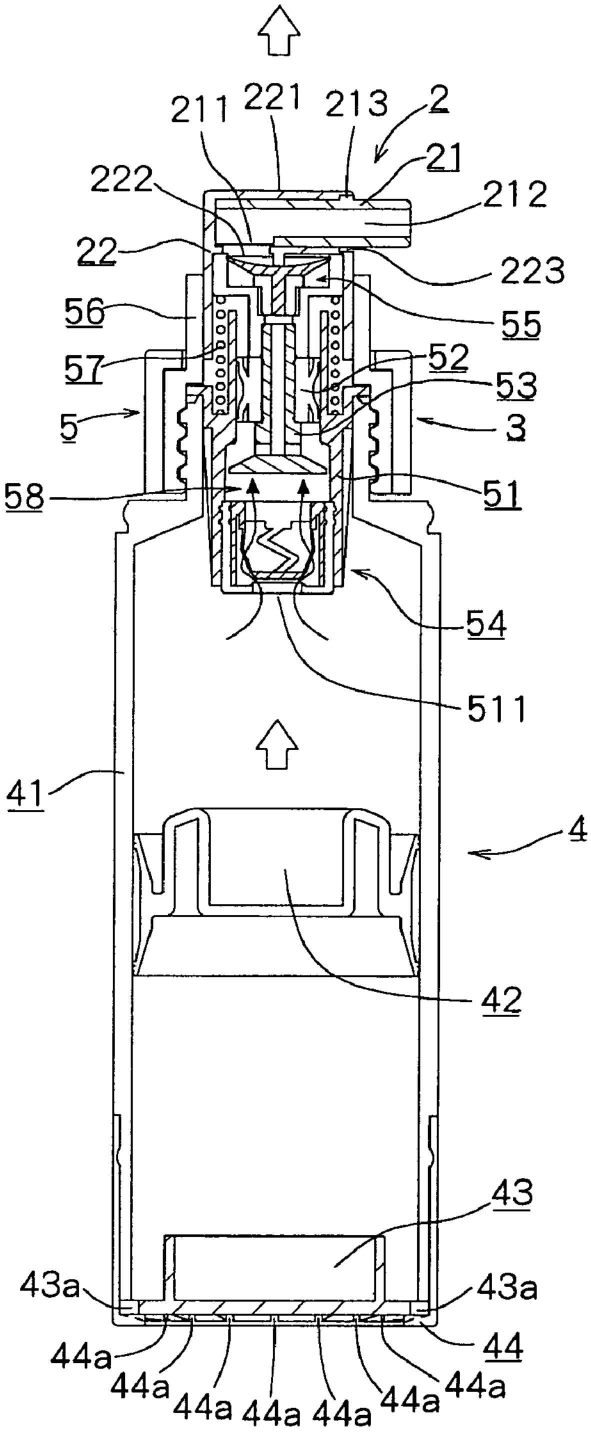
FIG. 15 is 1 is a longitudinal sectional view of the fluid-storing container of FIG. 13 when the nozzle head 2 is released.

Another embodiment of the present invention is described with reference to drawings attached. FIGS. 13-15 are longitudinal sectional views of a fluid-storing container to which the fluid-dispensing pump 5 according to Embodiment 2 of the present invention applies. Of these figures, FIG. 13 shows a fluid-dispensing pump 5 being left with no stress applied to it; FIG. 14 shows a coupling tube 53 being descending along with a piston 52 with a pushing portion 221 in a nozzle head 2 being pressed; FIG. 15 shows the coupling tube 53 being ascending along with the piston 52 with a pressure applied to the pushing portion 221 in the nozzle head 2 being removed. Additionally, when the same members as used in Embodiment 1 are used in Embodiment 2, the same symbols are used and detailed descriptions of the members are omitted.

While the fluid-storing container according to Embodiment 1 comprises the fluid-dispensing pump 1, a fluid-storing container according to Embodiment 2 comprises a fluid-dispensing pump 5.

In the fluid-storing container according to Embodiment 2, similarly to the fluid-storing container according to Embodiment 1, as shown in FIG. 14, by reciprocating a pushing portion 221 in a nozzle head 2 which has been switched over to an open position upward and downward by pressing it, a fluid stored inside a fluid-storing portion 4 is discharged from the outflow portion 212 in the nozzle head 2 by the action of the fluid-dispensing pump 5 described in detail later. As shown in FIG. 15, as an amount of the fluid inside the fluid-storing portion 4 is decreased, the piston member 42 travels inside the cylinder member 41 toward the nozzle head 2.

Figure 16:
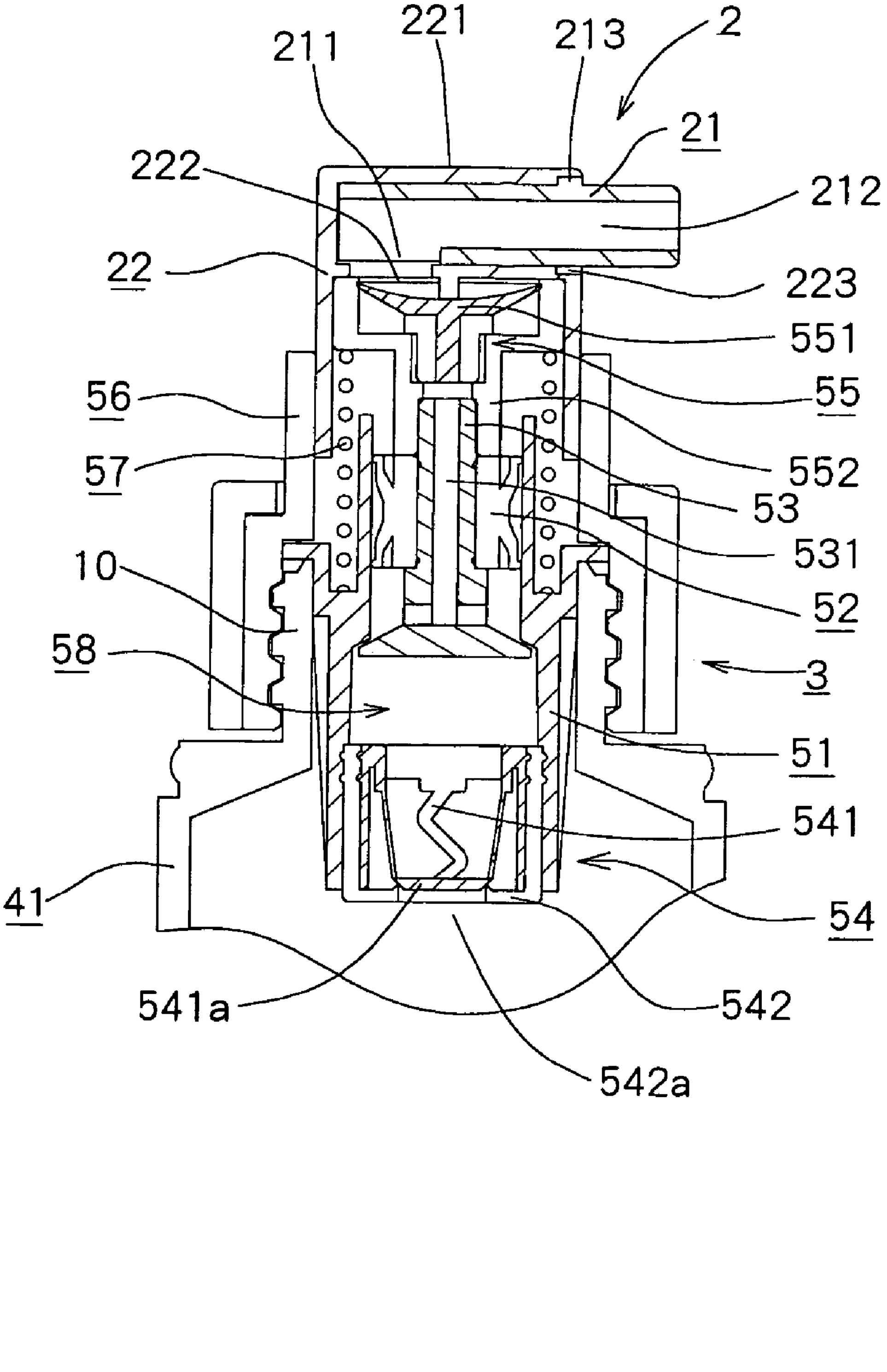
FIG. 16 is a longitudinal sectional view showing a relative part of the fluid-dispensing pump 5.
Figure 17:
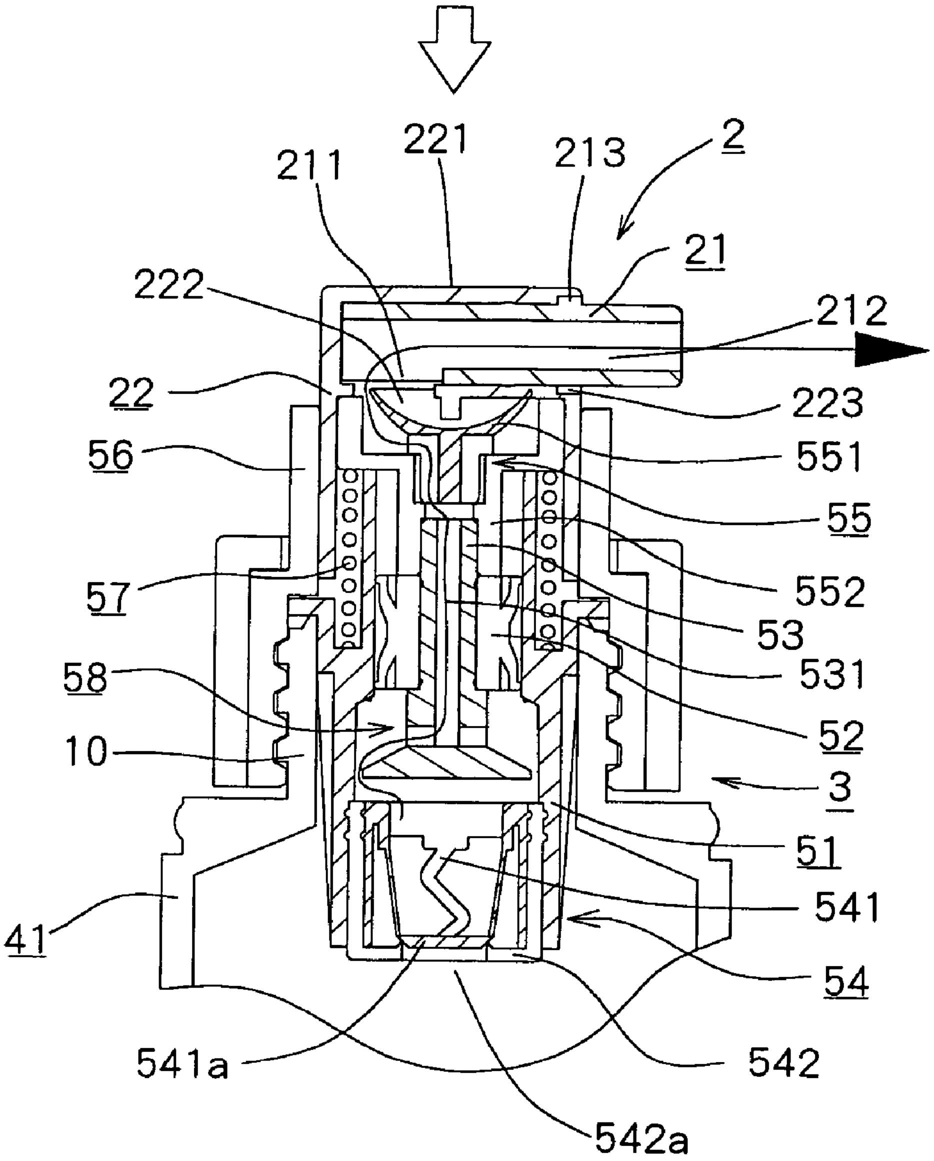
FIG. 17 is a longitudinal sectional view of the fluid-dispensing pump 5 when the nozzle head 2 is pressed.
Figure 18:
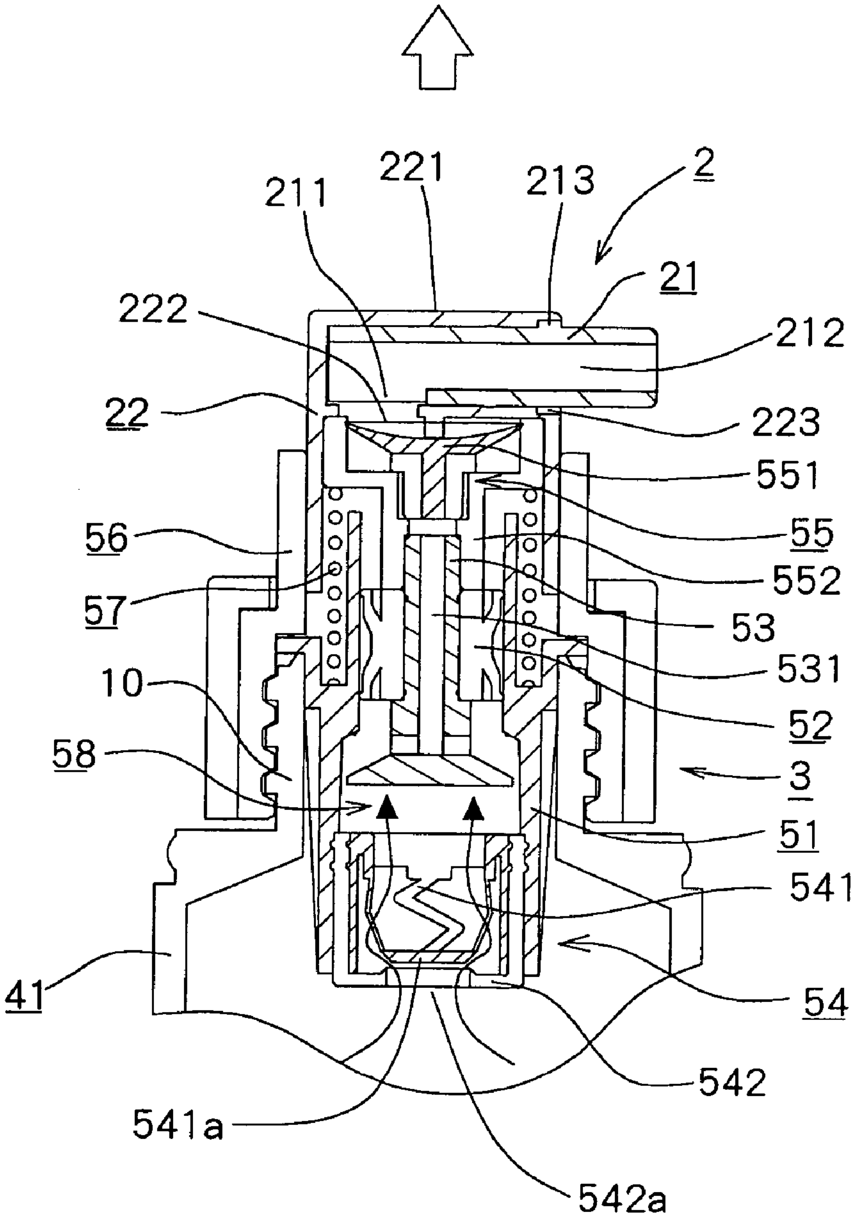
FIG. 18 is a longitudinal sectional view of the fluid-dispensing pump 5 when he nozzle head 2 is released.

A configuration of the fluid-dispensing pump 5 according to Embodiment 2 of the present invention is described below. FIGS. 16-18 are longitudinal sectional views showing the fluid-dispensing pump 5 according to Embodiment 2 of the present invention along with the nozzle head 2.

Of these figures, FIG. 16 shows the fluid-dispensing pump 5 being left with no stress applied to it; FIG. 17 shows the coupling tube 53 being descending along with the piston 52 with the pushing portion 221 in the nozzle head 2 being pressed; FIG. 18 shows the coupling tube 53 being ascending along with the piston 52 with a pressure applied to the pushing portion 221 in the nozzle head 2 removed.

This fluid-dispensing pump 5 comprises the cylinder 51 disposed on top of the fluid-storing portion 4, the piston 52 which can reciprocate inside the cylinder 51, the coupling tube 53 for sending the piston 52 down by transmitting a pressure applied to the nozzle head 2 to the piston 52 by coupling the nozzle head 2 and the piston 52, in which a hollow fluid flow path 531 is formed, a coil spring 57 as an elastic member disposed in the outer periphery of the coupling tube 53 for giving momentum to the piston 52 in a direction of sending it up via the coupling tube 53, an inflow valve mechanism 54 for letting a fluid stored inside the fluid-storing portion 4 flow out to the cylinder 51 as the piston 52 ascends, an outflow valve mechanism 55 for letting a fluid having flowed into the cylinder 51 flow out to the nozzle head 2 via the fluid flow path 531 of the coupling tube 53, and a leakage prevention mechanism 58 disposed at the bottom of the coupling tube 53, which prevents a fluid having flowed into the cylinder 51 from leaking out to the fluid flow path 531 of the coupling tube 53 when a pressure is not applied to the nozzle head 2.

Figure 19A:
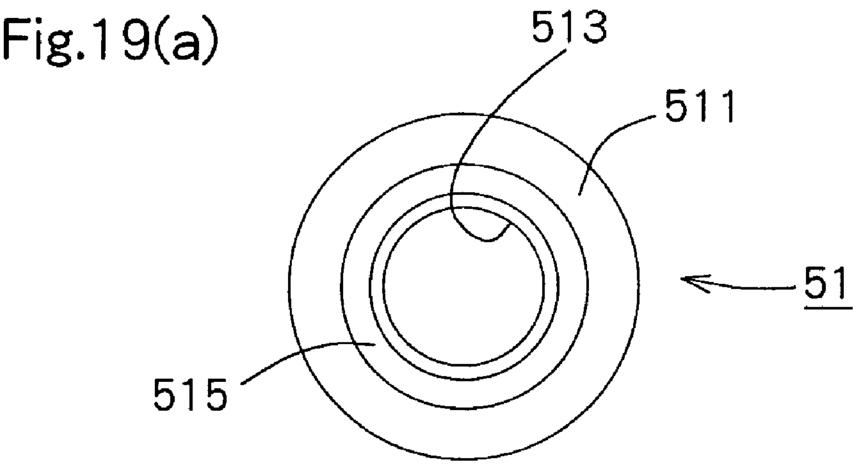
FIGS. 19(*a*)-(*c*) are explanatory views showing a cylinder 51 in the fluid-dispensing pump 5.
Figure 19B:
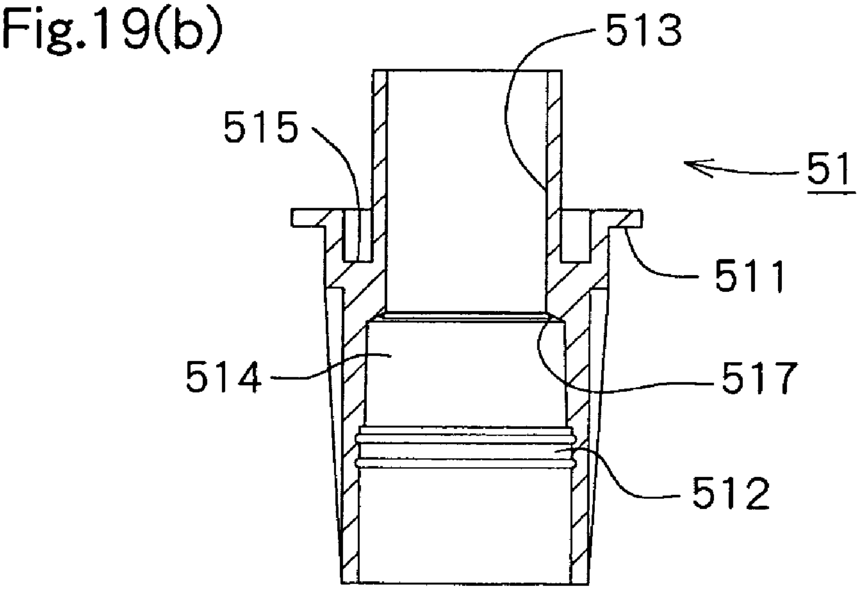
Figure 19C:
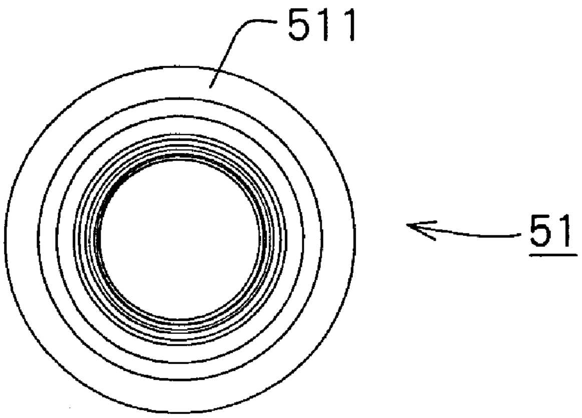

FIG. 19(*a*)-(*c*) are a front view, sectional side view, and back side view, respectively, showing the cylinder 51 in the fluid-dispensing pump 5.

As shown in FIGS. 19(*a*)-(*c*), the cylinder 51 comprises an engaging portion 511 engaging with the fluid-storing portion 4, a fixing portion 512 for fixing the inflow valve mechanism at its bottom, a piston traveling portion 513 for making the piston 53 to travel with its outer peripheral surface closely contacting the cylinder, a tubular wall surface 514 being disposed below the piston traveling portion 513 and functioning as a main body in the leakage prevention member 58 described in detail later, and a coil spring fixing portion 515 for fixing the coil spring 57 by inserting the lower end of the coil spring into it.

Figure 20A:
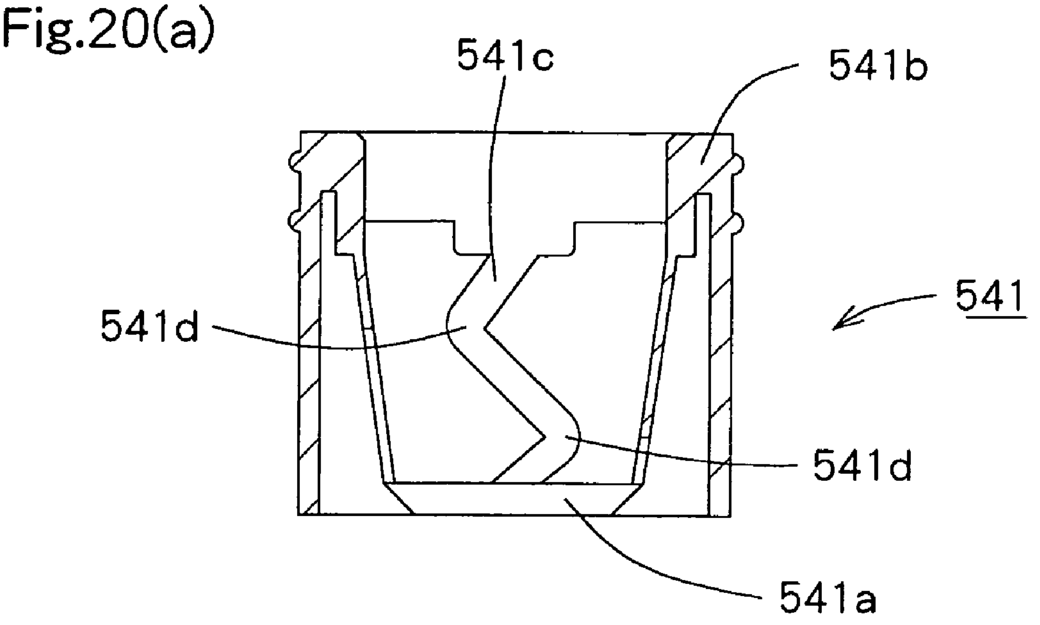
FIGS. 20(*a*)-(*b*) are explanatory views showing an inflow valve member 541 in the fluid-dispensing pump 5.
Figure 20B:
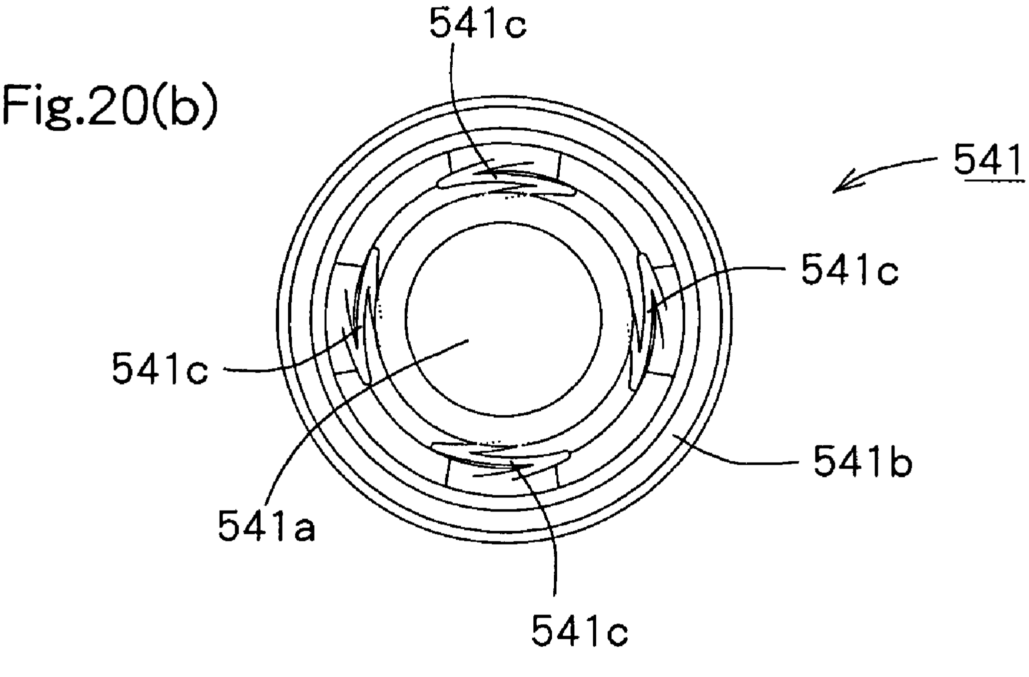

FIGS. 20(*a*)-(*b*) are a front view and back side view, respectively, showing the inflow valve member 541 comprising the inflow valve mechanism 54 in the fluid-dispensing pump 5.

Figure 21A:
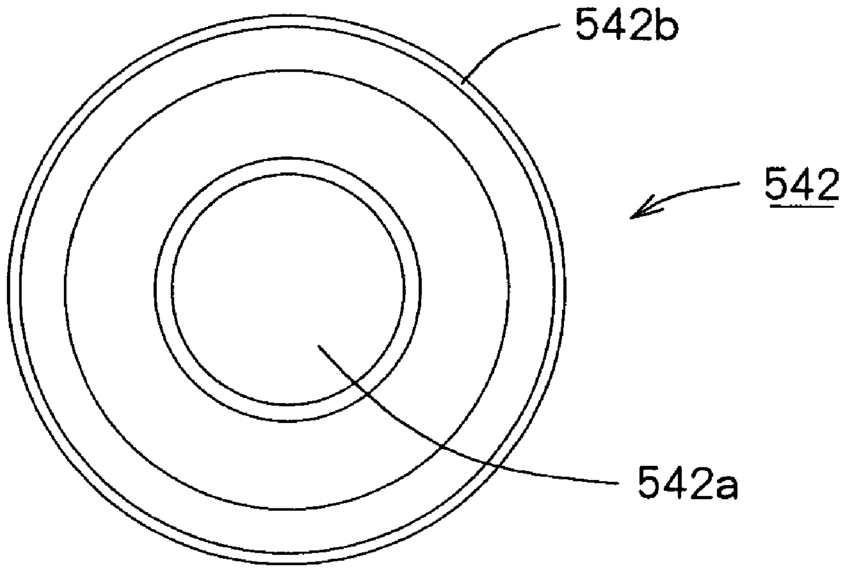
FIGS. 21(*a*)-(*b*) are explanatory views showing an inflow valve seat member 542 in the fluid-dispensing pump 5.
Figure 21B:
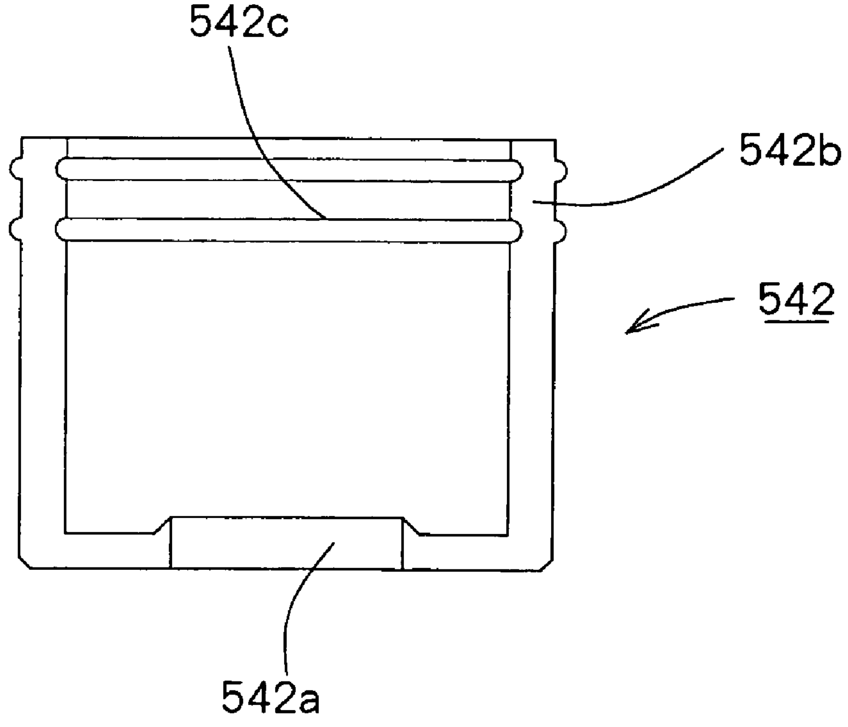

FIGS. 21(*a*)-(*b*) are a front view and lateral cross section, respectively, showing an inflow valve seat member 542 comprising the inflow valve mechanism 54.

The inflow valve mechanism 54 comprises the inflow valve member 541 and the inflow valve seat member 542.

The inflow valve seat member 542 comprises an opening portion 542*a* formed for letting a fluid stored inside the fluid-storing portion 4 flow into the cylinder 51, a convex portion 542*b* for engaging with the fixing portion 512 disposed in the cylinder 51, and a valve member fixing portion 542*c* for fixing the inflow valve member 541.

The inflow valve member 541 comprises a valve body 541*a* having a shape corresponding to the opening portion 542*a* formed in the inflow valve seat member 542, a supporting portion 541*b* being fixed by joining with the valve member fixing portion 542*c* of the inflow valve seat member 542, and four coupling portions 541*c* coupling the valve body 541*a* and the supporting portion 541*b*. The respective four coupling portions have a pair of flexions 541*d*. By this, this inflow valve member 541 has more preferred flexibility.

This inflow valve mechanism 54 is intended to close and open the opening portion 542*a* being formed in the inflow valve seat member 542 and communicated with the fluid-storing portion 4 fixed in cylinder 51 and the cylinder 51. When inside the cylinder 51 is not depressurized, this inflow valve mechanism 54 closes the opening portion 542*a* with the valve body 541*a* in the inflow valve member 541 being disposed in a position in which it contacts the opening portion 542*a*. When inside the cylinder is depressurized, the valve body 541*a* is disposed in a position in which it separates from the opening portion 542*a* by the action of the coupling portions 541*c*, thereby opening the opening portion 542*a*.

Figure 22A:
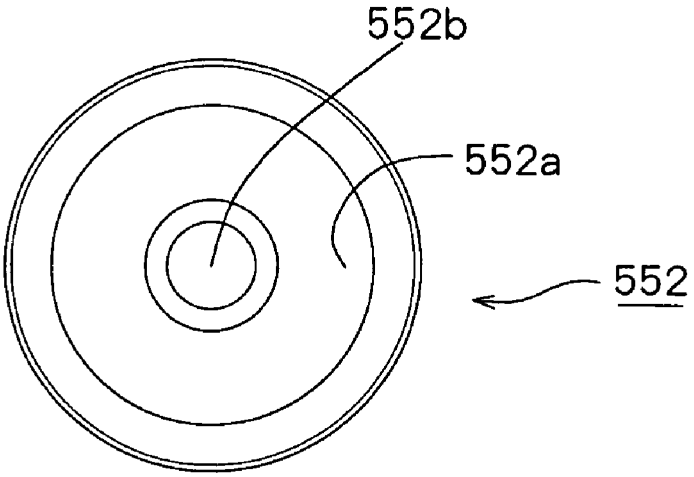
FIGS. 22(*a*)-(*c*) are explanatory views showing an outflow valve seat member 552 in the fluid-dispensing pump 5.
Figure 22B:
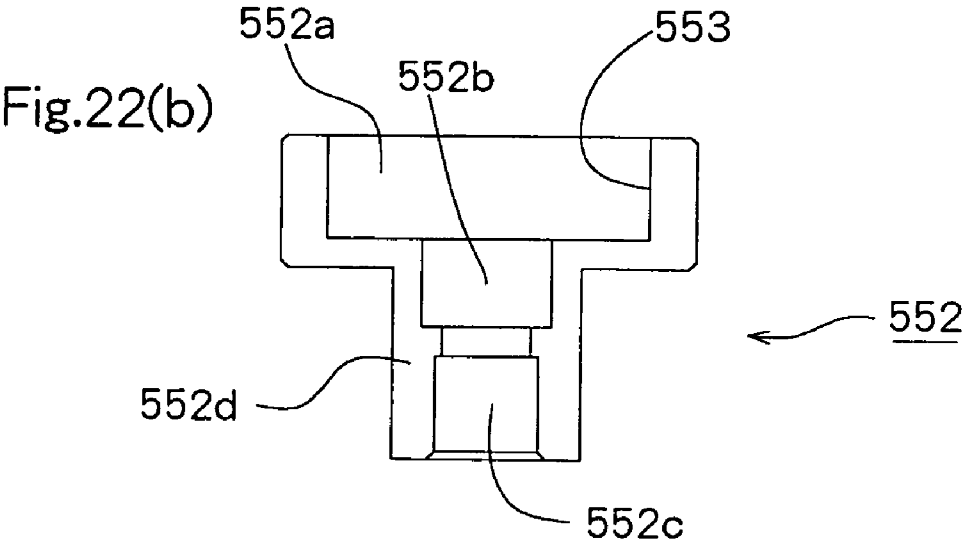
Figure 22C:
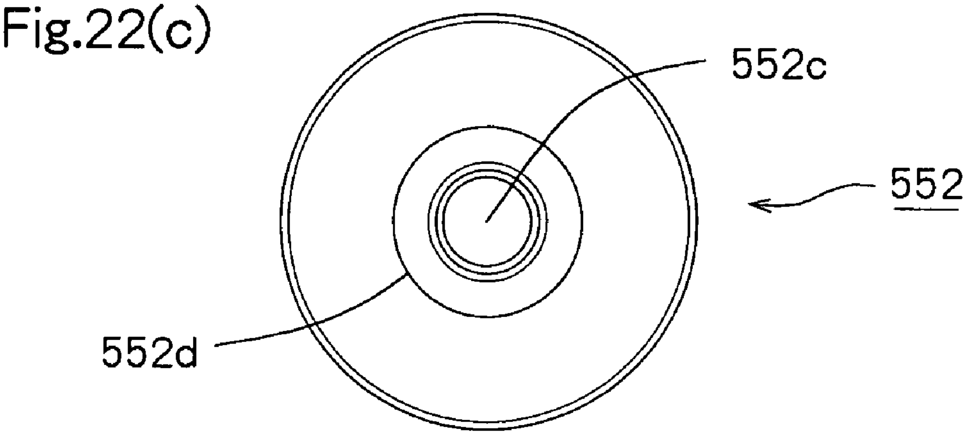

FIGS. 22(*a*)-(*c*) are a front view, sectional side view, and back side view, respectively, showing an outflow valve seat member 552 comprising the outflow valve mechanism 55 in the fluid-dispensing pump 5.

The outflow valve mechanism 55 comprises an outflow valve member 551 and an outflow valve seat member 552. Additionally, because the outflow valve member 551 has the same configuration as that of the outflow valve member 151, detailed explanation of the outflow valve member 551 is omitted.

The outflow valve seat member 552 comprises a cylindrical opening portion 552*a* having a shape corresponding to a valve portion in the outflow valve member 551, a supporting portion 552*b* supporting a base of the outflow valve member 551, a joined portion 552*c* being joined with the upper portion of the coupling tube 53 described in detail later, and an inserted/fitted portion 552*d* fixed by being inserted/fitted into the cylinder 51.

This outflow valve mechanism 55 is intended to close and a flow path leading to the upper and lower sides of the outflow valve seat member 552 being communicated with the fluid flow path 531 in the coupling tube 53 and an outflow portion 212 in the nozzle head 2. When inside the fluid flow path 531 of the coupling tube 53 is pressurized, this outflow valve mechanism 55 opens the flow path leading to the upper and lower sides of the outflow valve seat member 552 with the valve body of the outflow valve member 551 in the outflow valve mechanism 55 being disposed in a position in which it separates from the opening portion 552*a*. When inside the cylinder is not pressurized, the valve body of the outflow valve member 551 in the outflow valve mechanism 55 is disposed in a position in which it contacts the opening portion 552*a*, thereby closing the flow path leading to the upper and lower sides of the outflow valve seat member 552.

Figure 23A:
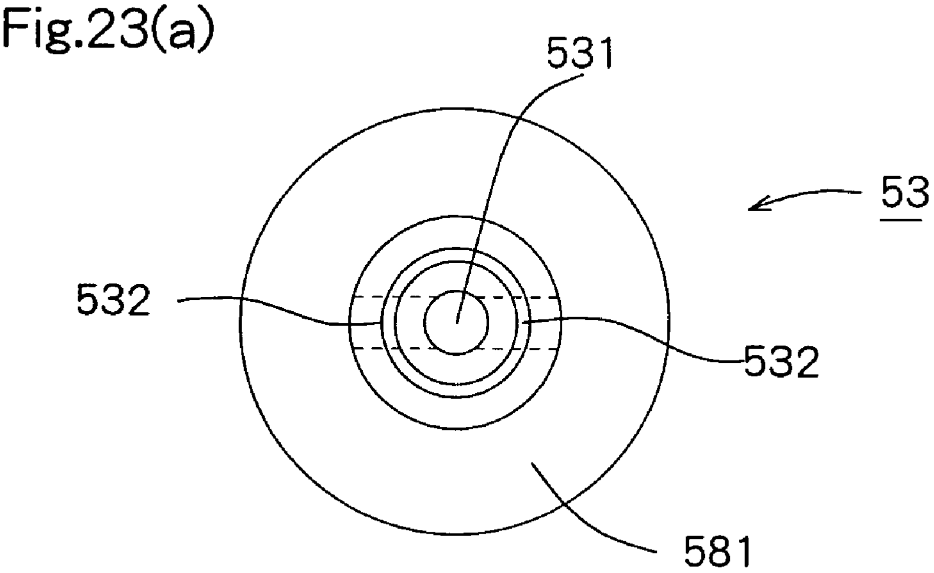
FIGS. 23(*a*)-(*b*) are explanatory views showing a coupling tube 53 in the fluid-dispensing pump 5.
Figure 23B:
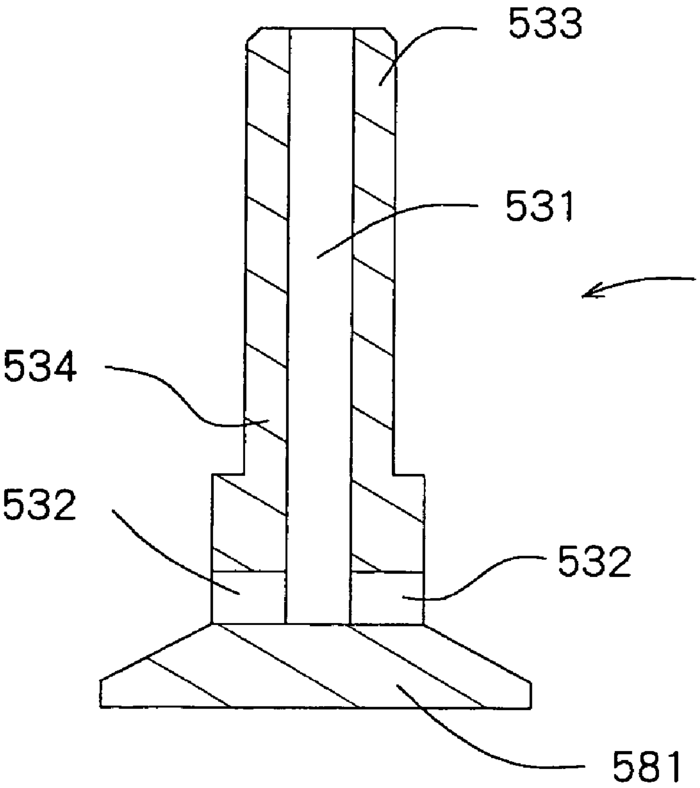

FIGS. 23(*a*)-(*b*) are a front view and sectional side view, respectively, showing the coupling tube 53 in the fluid-dispensing pump 5 along with a lid member 1 comprising the leakage prevention mechanism 58.

The coupling tube 53 comprises a joined portion 533 being fixed by being inserted/fitted into the joined portion 552*c* of the outflow valve seat member 552, and a fixing portion 534 for fixing the piston 12. Additionally, inside the coupling tube 53, the fluid flow path 531 is formed. Inside the coupling tube 53, an inflow opening 532 being communicated with the fluid flow path 531 and the outside of the coupling tube 53 is further formed.

The lid member 581 comprising the leakage prevention mechanism 58 has flexibility and a nearly dish shape corresponding to the tubular wall surface 514 functioning as a main body in the leakage prevention member 58 in the cylinder 51.

In Embodiment 2, the coupling tube 53 and the lid member 581 in the leakage prevention mechanism 58 are formed as one. Therefore, manufacturing the fluid-dispensing pump is easy at low costs even though its configuration is simple; it becomes possible to maintain the fluid-dispensing pump 5 clean.

The leakage prevention mechanism 58 comprises the wall surface 514 in the cylinder 51 and the lid member 581. This leakage prevention mechanism 58 is intended to prevent a fluid having flowed into the cylinder 51 from leaking out to the fluid flow path 531 of the coupling tube 53 when stress is not applied to the nozzle head 2. When inside the space formed between the inflow valve mechanism 54 and the leakage prevention mechanism 58 is pressurized with a pressure being applied to the nozzle head 2, it becomes possible that a fluid inside a space formed between the inflow valve mechanism 54 and the leakage prevention mechanism 58 flows into the inflow opening 532 in the coupling tube 53 with the outer peripheral surface of the lid member 581 having flexibility being disposed in a position in which it separates from the wall surface 514. When the space formed between the inflow valve mechanism 54 and the leakage prevention mechanism 58 is not pressurized with a pressure applied to the nozzle head 2 removed, the lid member 581 having flexibility is disposed in a position in which it contacts the wall surface 514, thereby enabling to prevent a fluid from leaking into the coupling tube 53 from the space formed between the inflow valve mechanism 54 and the leakage prevention mechanism 58.

The piston 52 has a similar configuration to that of the piston 12; and using a resin such as silicon rubber as a source material, its outer periphery is formed so as to closely contact the piston traveling portion 513 in the cylinder 51.

Figure 24:
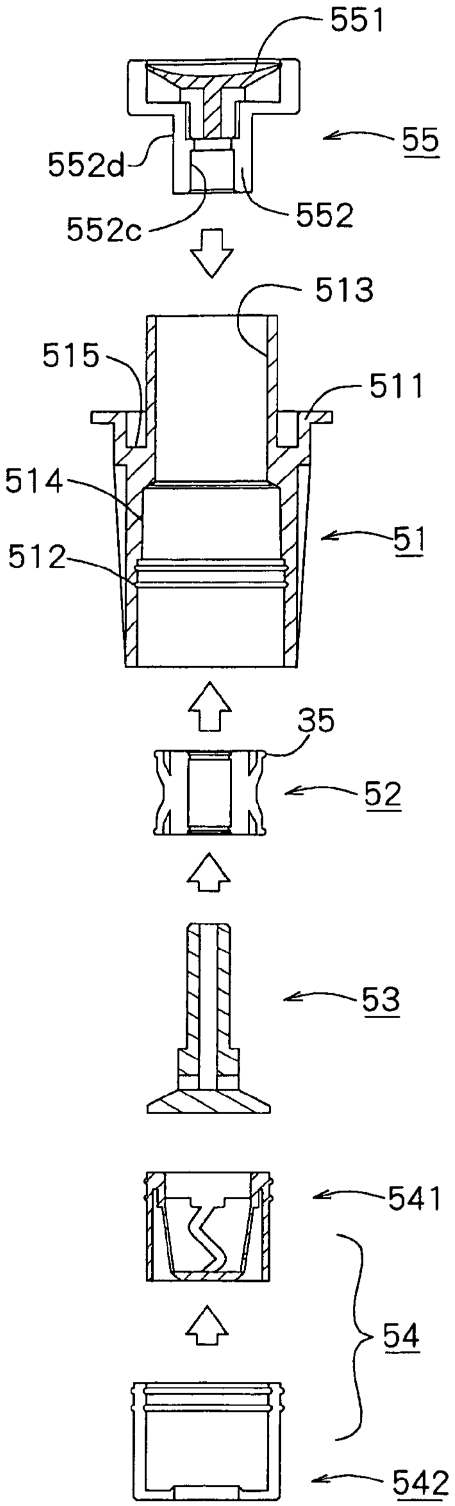
FIG. 24 is an explanatory view showing parts of the fluid-dispensing pump 5.

FIG. 24 is an explanatory view showing a configuration of the fluid-dispensing pump 5 according to Embodiment 2 of the present invention.

As shown in FIG. 24, the upper-end portion of the coupling tube 13 in which the piston 12 is fixedly provided, inside the cylinder 51, comprises the outflow valve member 551 and the outflow valve seat member 552 and is fixed by being inserted/fitted into the joined portion 552*c* in the outflow valve mechanism 55. An inserted/fitted portion 552*d* in the outflow valve mechanism 55 is fixed by being inserted/fitted into the cylinder 51. The inflow valve mechanism 54 comprising the inflow valve member 541 and the inflow valve seat member 542 is fixed with the fixing portion 512 in the cylinder 51 and the convex portion 542*b* in the inflow valve mechanism 54 being joined.

With the configuration described above, the piston 52, the coupling tube 53, and the nozzle head 2 travel as one.

Fluid discharge action of the fluid-dispensing pump 5 having the configuration described above is described referring to FIGS. 16-18 again.

As shown in FIG. 16, when the fluid-dispensing pump 5 is left with no stress being applied, in the fluid-dispensing pump 5, the valve body 541*a* of the inflow valve member 541 is disposed in a position in which it contacts the opening portion 552*a* in the inflow valve seat member 542, the valve body 551*a* in the outflow valve member 551 is disposed in a position in which it contacts an inner surface of the opening portion 552*a*, and the lid member 581 is disposed in a position in which it contacts the wall surface 514. Consequently, it becomes possible to prevent fluid leakage from the space formed between the inflow valve mechanism 54 and the leakage prevention mechanism 58.

As shown in FIG. 17, when a pressure is applied to the pushing portion 221 in the nozzle head 2, the piston 52, the coupling tube 53, and the nozzle head 2 descend as one.

At this time, with the space formed between the inflow valve mechanism 14 and the leakage prevention mechanism 58 being reduced, inside the space is pressurized. With the space formed between the inflow valve mechanism 54 and the leakage prevention mechanism 58 being pressurized, the lid member 581 having flexibility is disposed in a position in which it separates from the wall surface 514 of the cylinder 51, and a fluid inside the space formed between the inflow valve mechanism 54 and the leakage prevention mechanism 58 flows into the inflow opening 532 in the coupling tube 53.

By inflow of the fluid from the inflow opening 532 of the coupling tube 53, inside the fluid flow path 531 of the coupling tube 53 is pressurized. With inside the fluid flow path 531 being pressurized, the outflow valve mechanism 55 is pressurized from below, and the valve body 551*a* in the outflow valve member 551 is disposed in a position in which it separates from the inner surface of the opening portion 552*a*. By this, the opening portion 552*a* is opened, and a fluid flows out to the outside from the outflow portion 212 after passing through the outflow valve mechanism 55.

As shown in FIG. 18, when a pressure applied to the pushing portion 221 in the nozzle head 2 is removed, the coupling tube 53 ascends along with the piston 52 by the momentum of the coil spring 57.

At this time, with the space formed between the inflow valve mechanism 54 and the leakage prevention mechanism 58 being expanded, inside the space is depressurized. With the space formed between the inflow valve mechanism 54 and the leakage prevention mechanism 58 being depressurized, the lid member 581*a* having flexibility is disposed in a position in which it contacts the wall surface 514 of the cylinder 51; by the action of the coupling portions 541*c* in the inflow valve member 541, the valve body 541*a* of the inflow valve seat member 542 is disposed in a position in which it separates from the opening portion 542*a*, thereby opening the opening portion 542*a*; a fluid stored inside the fluid-storing portion 4 flows into the cylinder 51 after passing through the inflow valve mechanism 54.

Because the fluid-dispensing pump 5 according to Embodiment 2 of the present invention has the configuration described above, it can prevent fluid leakage securely even though its configuration is simple. Additionally, it becomes possible to maintain the fluid-dispensing pump clean by preventing corrosion of the coil spring 57.

It is preferable that the inflow valve mechanisms 14, 54, and the outflow valve mechanisms 15, 55 comprise, for example, a resin such as polyethylene and polypropylene, rubber composite such as silicon rubber, or a mixture of the foregoing.

In the above, any elements used in Embodiment 1 can interchangeably or additionally be used in Embodiment 2 and vise versa.

The present invention includes the above mentioned embodiments and other various embodiments including the following:

1) A fluid-dispensing pump for discharging a fluid stored inside a fluid-storing portion from a nozzle head disposed on the upper side of the fluid-storing portion by pressing the nozzle head; the fluid-dispensing pump is characterized by comprising a cylinder disposed on top of the fluid-storing portion, a piston which can reciprocate inside the cylinder, a coupling tube for sending the piston down by transmitting a pressure applied to the nozzle head by coupling the nozzle head and the piston, in which a hollow fluid flow path is formed, an elastic member disposed in the outer periphery of the coupling tube for giving momentum to the piston in a direction of sending it up via the coupling tube, an inflow valve mechanism for letting a fluid stored inside the fluid-storing portion flow out to the cylinder, an outflow valve mechanism for letting a fluid having flowed into the cylinder flow out to the nozzle head via the fluid flow path of the coupling tube, and a leakage prevention mechanism disposed at the bottom of the coupling tube, which prevents a fluid having flowed into the cylinder from leaking out to the fluid flow path of the coupling tube when a pressure is not applied to the nozzle head.

2) In the fluid-dispensing pump of Item 1, the leakage prevention mechanism comprises a main body having an opening portion, and a lid member which travels along with the coupling tube between a closed position in which it closes the opening portion of the main body, and an open position in which it opens the opening portion of the main body.

3) In the fluid-dispensing pump of Item 2, the main body in the leakage prevention mechanism is part of the cylinder.

4) In the fluid-dispensing pump of Item 2, the main body in the leakage prevention mechanism is part of the inflow valve mechanism.

Because the embodiment of Item 1 comprises the leakage prevention mechanism being provided fixedly at the lower end of the coupling tube and preventing a fluid having flowed into the cylinder from leaking out to the fluid flow path of the coupling tube when a pressure is not applied to the nozzle head, it becomes possible to prevent fluid leakage securely even though its configuration is simple; additionally, it becomes possible to maintain the fluid-dispensing pump clean.

Because in the embodiment of Item 2, the leakage prevention mechanism comprises the main body having the opening portion, and the lid member which travels along with the coupling tube between a closed position in which it closes the opening portion of the main body, and an open position in which it opens the opening portion of the main body, it becomes possible to manufacture the fluid-dispensing pump easily and to prevent fluid leakage securely although its configuration is simple.

Because in the embodiment of Item 3, a tube member in the leakage prevention mechanism is part of the cylinder, it becomes possible to manufacture the fluid-dispensing pump easily at low costs and to prevent fluid leakage securely although its configuration is simple.

Because in the embodiment of Item 4, a tube member in the leakage prevention mechanism is part of the inflow valve mechanism, it becomes possible to manufacture the fluid-dispensing pump easily at low costs and to prevent fluid leakage securely although its configuration is simple.

Further, although the foregoing embodiments are preferable, the following modifications can be applied to any of the foregoing embodiments:

In an embodiment, instead of the coil spring 17, a bellows member can be used which also can serve as the coupling tube aiding member.

In an embodiment, instead of the piston 42, an inner bag which is compressible as the inner pressure decreases can be used, wherein the inner bag is enclosed by an outer container.

The cylinder and/or the container need not have a circular cross section and can have an elliptical cross section or any curved cross section or any shape having rounded edges or corners, as long as fluid-tightness is effectively maintained when the piston moves. The other parts can have shapes accordingly.

All of the elements can be made of a resin such as polyethylene and polypropylene, rubber composite such as silicon rubber, or a mixture of the foregoing. Hardness of each element can be adjusted even though multiple elements are integrally formed as a one piece by adjusting curing methods, dimensions or shapes. In an embodiment, the coil spring can be formed with a metal or plastic.

The inflow valve mechanism can be of any type such as those disclosed in U.S. Pat. No. 6,688,495 to Masatoshi Masuda (the inventor of the present application), the disclosure of which is herein incorporated by reference in its entirety.

Further, the disclosure of United States Patent Publication No. 2004/0055457 to Masatoshi Masuda (the inventor of the present application) is herein incorporated by reference in its entirety. Any elements disclosed in the publication which are applicable to any embodiments of the present invention can be used.

The present application claims priority to Japanese Patent Application No. 2004-092747, filed Mar. 26, 2004, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A fluid-dispensing pump for discharging therethrough a fluid stored inside a fluid-storing portion from a nozzle head, said fluid-dispensing pump being configured to be disposed between the fluid-storing portion and the nozzle head and comprising:

a cylinder;

an inflow valve mechanism disposed at a bottom of the cylinder for introducing the fluid into the cylinder;

an outflow valve mechanism disposed near the nozzle head for discharging the fluid through the nozzle head;

a central tube having a fluid path axially formed inside;

a leakage prevention valve body fixed at and extending outward from a lower end of the central tube; and a piston fixed around and to the central tube and configured to fluid-tightly reciprocate against an inner wall of the cylinder with the central tube and the leakage prevention valve body between a lower position and an upper position, wherein the central tube has an inlet opening disposed between the piston and the leakage prevention valve body and communicated with the fluid path, wherein an inner surface is formed inside the cylinder and is in contact with a periphery of the leakage prevention valve body to close a space therebetween when the piston is at the upper position.

2. The fluid-dispensing pump according to claim 1, wherein the inflow valve mechanism is fitted inside the cylinder and the inner surface inside the cylinder is constituted by a part of the inflow valve mechanism.

3. The fluid-dispensing pump according to claim 2, wherein the inflow valve mechanism comprises an inflow valve body member composed of a valve body, a support, and connecting members which elastically connect the valve body to the support, wherein the part of the inflow valve mechanism constituting the inner surface is an inner surface of the support.

4. The fluid-dispensing pump according to claim 1, wherein the inner surface inside the cylinder is a part of an inner wall of the cylinder.

5. The fluid-dispensing pump according to claim 4, wherein the inner wall of the cylinder comprises a first portion having a first inner diameter configured to fit the piston therein and a second portion having second inner diameter configured to fit the leakage prevention valve body therein, the second inner diameter being greater than the first inner diameter, wherein the inner surface inside the cylinder is a step formed between the first portion and the second portion.

6. The fluid-dispensing pump according to claim 1, further comprising an urging member which elastically biases the piston upward.

7. The fluid-dispensing pump according to claim 6, wherein the urging member is a coil spring disposed between the outflow valve mechanism and the piston outside the central tube.

8. The fluid-dispensing pump according to claim 1, further comprising a coupling member which couples the outflow valve mechanism and the central tube, wherein the outflow valve mechanism is comprised of an outflow valve body member and an outflow valve seat member which is integrally formed with and becomes a part of the coupling member, wherein a periphery of the outflow valve body member is in contact with an inner surface of the valve seat member to close the outflow valve mechanism when the piston moves toward the upper position.

9. The fluid-dispensing pump according to claim 1, wherein the inflow valve mechanism is comprised of an inflow valve body member and an inflow valve seat member which is integrally formed with and becomes a part of the cylinder, wherein the inflow valve body member is in contact with the inflow valve seat member to close the inflow valve mechanism when the piston moves toward the lower position.

10. The fluid-dispensing pump according to claim 1, wherein the inflow valve mechanism is comprised of an inflow valve body member and an inflow valve seat member which is fixed inside the cylinder, wherein the inflow valve body member is in contact with the inflow valve seat member to close the inflow valve mechanism when the piston moves toward the lower position.

11. The fluid-dispensing pump according to claim 1, wherein the cylinder has a flange configured to be attached to a neck portion of the fluid-storing portion.

12. The fluid-dispensing pump according to claim 8, wherein the outflow valve body member comprises a base and a valve body attached to and extending outward from the base, said base having grooves in an axial direction of the coupling member and being fitted in the coupling member.

13. A container for storing and discharging a fluid, comprising:

a fluid-storing portion for storing a fluid therein;

a nozzle head for discharging the fluid therethrough; and the fluid-dispensing pump set forth in claim 1 provided between the fluid-storing portion and the nozzle head.

14. The container according to claim 13, wherein the fluid-storing portion is comprised of a neck portion to which the fluid-dispensing pump is connected, a side wall, and a piston provided at a bottom opposite to the neck portion, said piston being movable toward the neck portion as an inner pressure of the fluid-storing portion decreases.

15. The container according to claim 13, wherein the fluid-storing portion is comprised of a neck portion to which the fluid-dispensing pump is connected, a side wall, and a bottom, wherein the cylinder has a flange attached to the neck portion.

16. The container according to claim 15, further comprising a screw member which secures the flange and the neck portion.

* * * * *